United States Patent
Kasahara et al.

(10) Patent No.: US 6,788,788 B1
(45) Date of Patent: Sep. 7, 2004

(54) CRYPTOGRAPHIC COMMUNICATION METHOD, ENCRYPTION METHOD, AND CRYPTOGRAPHIC COMMUNICATION SYSTEM

(75) Inventors: Masao Kasahara, Minoo (JP); Yasuyuki Murakami, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/397,983

(22) Filed: Sep. 16, 1999

(30) Foreign Application Priority Data

Sep. 16, 1998 (JP) ............................................. 10-262035
Nov. 27, 1998 (JP) ............................................. 10-338190

(51) Int. Cl.$^7$ ................................................ H04L 9/00
(52) U.S. Cl. ...................................... 380/277; 380/279
(58) Field of Search .................................. 380/277, 279

(56) References Cited

U.S. PATENT DOCUMENTS 5,016,276 A    5/1991  Matumoto et al.
5,987,129 A *  11/1999 Baba .......................... 380/279
6,289,454 B1 * 9/2001  Eslinger et al. ............. 713/189

OTHER PUBLICATIONS

"New Directions in Cryptography" Whitfield Diffe and Martin E. Hellman, Jun. 23–25 1975, p. 34.*

Rolf Blom, "Non–Public Key Distribution", Advances in cryptology: proceedings of CRYPTO 82/ edited by David Chaum, Ronald L. Rivest, and Alan T. sherman / New York: Plenum Press, pp. 231–236.

Adi Shamir, "Identity–Based Cryptosystems and Signature Schemes", Advances in Cryptology: proceedings of CRYPTO 84 / edited by G.R. Blakley and David Chaum, / Berlin; Tokyo: Springer–Verlag, pp. 47–53.

* cited by examiner

*Primary Examiner*—Gregory Morse
*Assistant Examiner*—Christopher J Brown
(74) *Attorney, Agent, or Firm*—Hogan & Hartson, LLP

(57) ABSTRACT

A novel cryptographic communication system including ID-NIKS system with high security. Secret key generation functions and key sharing functions are not separable. Key sharing is also probabilistically possible. A center uses entity-specific random numbers and entity-specific public keys based on ID information for each entity to generate two types of secret key (vectors s and t) in which two numbers serve as the moduli, respectively. The center then sends these secret keys to each entity, and each entity uses these two types of its own entity-specific secret key sent from the center and disclosed public key of another entity (the entity who receives a ciphertext or sends a ciphertext) to generate a common key that is shared by two entities for use in the encrypting of a plaintext into a ciphertext and in the decrypting of a ciphertext into a plaintext.

44 Claims, 9 Drawing Sheets

FIG. 3

CENTER PUBLIC KEYS $$P = 9283461401, \quad Q = 9735184639$$

CENTER SECRET KEYS $$A = 7231904656, \quad B = 6512637039$$

$$\vec{\gamma}_i = 836$$

$$\vec{\gamma}_j = 481$$

PUBLIC KEYS OF ENTITIES $i$ AND $j$ $$\vec{v}_i = 723$$

$$\vec{v}_j = 592$$

SECRET KEYS OF ENTITY $i$ $$\vec{s}_i = \left( A \vec{v}_i + \vec{\gamma}_i \right) \bmod P = 2078298361$$

$$\vec{t}_i = \left( B \vec{v}_i - \vec{\gamma}_i \right) \bmod Q = 6542397724$$

SECRET KEYS OF ENTITY $j$ $$\vec{s}_j = \left( A \vec{v}_j + \vec{\gamma}_j \right) \bmod P = 1611850972$$

$$\vec{t}_j = \left( B \vec{v}_j - \vec{\gamma}_j \right) \bmod Q = 348009563$$

FIG. 4

GENERATION OF COMMON KEY OF ENTITY $i$ $$A_{ij}' = {}^t\vec{s_i}\,\vec{v_j} \bmod P = 4935724780$$

$$B_{ij}' = {}^t\vec{t_i}\,\vec{v_j} \bmod Q = 8231150925$$

$$K_{ij} = A_{ij}' + B_{ij}' = 13166875705$$

GENERATION OF COMMON KEY OF ENTITY $j$ $$A_{ji}' = {}^t\vec{s_j}\,\vec{v_i} \bmod P = 4935577631$$

$$B_{ji}' = {}^t\vec{t_j}\,\vec{v_i} \bmod Q = 8231298074$$

CENTER PUBLIC KEYS $$R = 31408759$$
$$P = 8763043763 \, (\delta = 2)$$
$$Q = 6281751803 \, (\varepsilon = 3)$$

CENTER SECRET KEYS $$A = 2784432351, \quad B = 5889382431$$
$$\vec{\gamma}_i = 73811$$
$$\vec{\gamma}_j = 37519$$

PUBLIC KEYS OF ENTITIES $i$ AND $j$ $$\vec{v}_i = 84726$$
$$\vec{v}_j = 82741$$

SECRET KEYS OF ENTITY $i$ $$\vec{s}_i = \left( A \vec{v}_i + \vec{\gamma}_i \right) \bmod P = 3914300914$$
$$\vec{t}_i = \left( B \vec{v}_i - \vec{\gamma}_i \right) \bmod Q = 5424807396$$

SECRET KEYS OF ENTITY $j$ $$\vec{s}_j = \left( A \vec{v}_j + \vec{\gamma}_j \right) \bmod P = 6296662340$$
$$\vec{t}_j = \left( B \vec{v}_j - \vec{\gamma}_j \right) \bmod Q = 5340823536$$

FIG. 6

GENERATION OF COMMON KEY OF ENTITY $i$ $$A_{ij}' = {}^t\vec{s_i}\,\vec{v_j} \bmod P = 8600532320$$

$$B_{ij}' = {}^t\vec{t_i}\,\vec{v_j} \bmod Q = 3977172677$$

$$K_{ij}' = A_{ij}' + B_{ij}' = 12577704997$$

$$K_{ij}'' = K_{ij}' \bmod R = 14201397$$

$$K_{ij} = \left[\frac{14201397}{10^2}\right] = 142013$$

GENERATION OF COMMON KEY OF ENTITY $j$ $$A_{ji}' = {}^t\vec{s_j}\,\vec{v_i} = 5672171163 \,(\bmod P)$$

$$B_{ji}' = {}^t\vec{t_j}\,\vec{v_i} = 623782031 \,(\bmod Q)$$

$$K_{ji}' = A_{ji}' + B_{ji}' = 6295953194$$

$$K_{ji}'' = K_{ji}' \bmod R = 14201394$$

$$K_{ji} = \left[\frac{14201394}{10^2}\right] = 142013$$

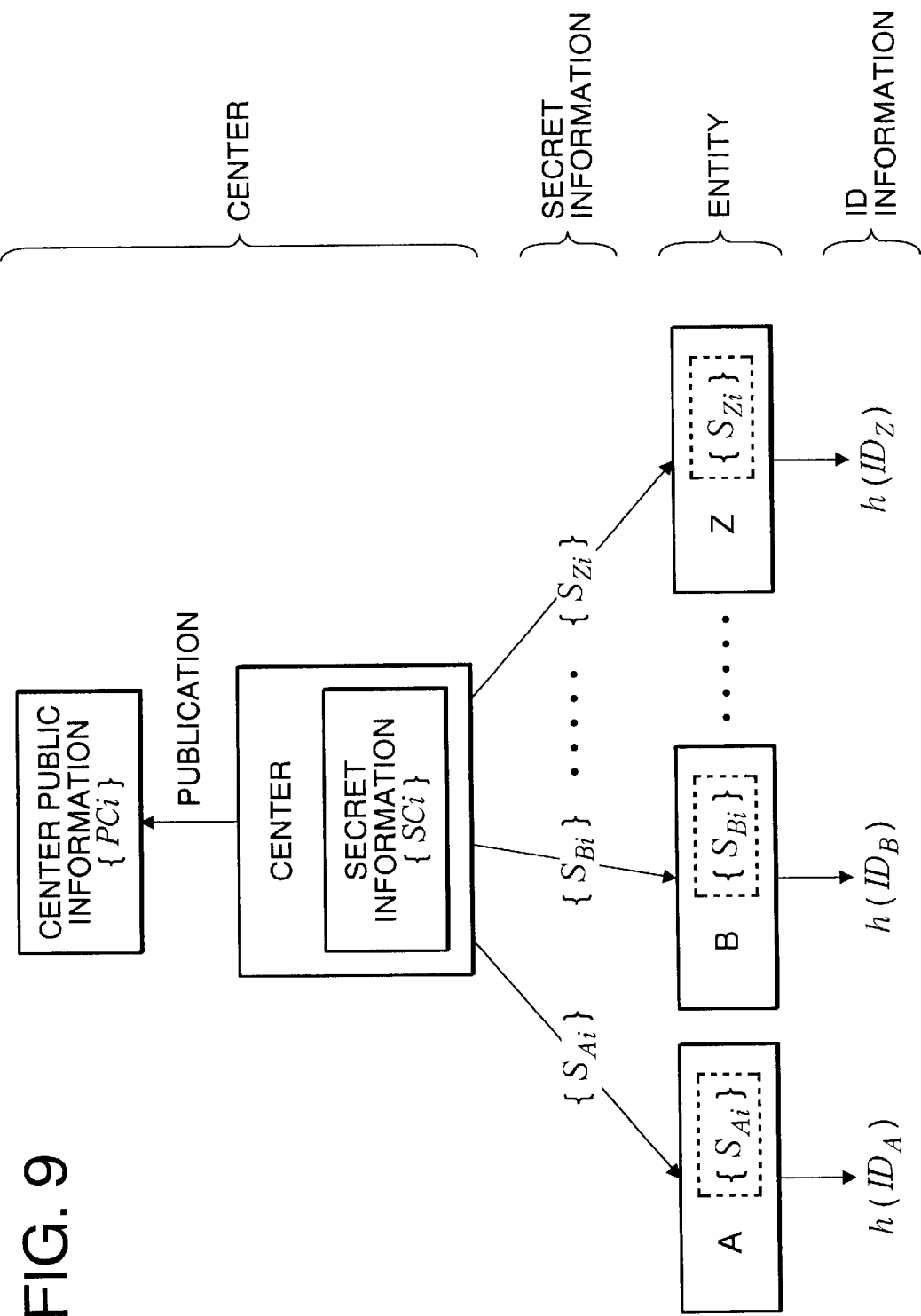

CRYPTOGRAPHIC COMMUNICATION METHOD, ENCRYPTION METHOD, AND CRYPTOGRAPHIC COMMUNICATION SYSTEM

This application relates to two applications concurrently filed herewith entitled (1) "ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM" that claims foreign priority based on Japanese patent applications 10-262036, filed Sep. 16, 1998 and 11-105815, filed Apr. 13, 1999 (inventors: Masao Kasahara and Yasuyuki Murakami; Express Mail EL 446 156 827 US) and (2) "ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM" that claims foreign priority based on Japanese patent applications 10-262037, filed Sep. 16, 1998 and 11-105814, filed Apr. 13, 1999 (inventors: Masao Kasahara and Yasuyuki Murakami; Express Mail EL 446 156 835 US), which applications are hereby incorporated by reference in their entirety.

BACKGROUND OF THE INVENTION

1. Field of the Invention

The present invention relates to a cryptographic communication method, encryption method, and cryptographic communication system that afford a high level of safety in encryption and communication of information by utilizing information encrypted in such a manner not to be understood by anyone but the intended persons.

2. Description of the Related Art

In today's society, sometimes called the advanced information society, documents and graphic information that are important for business are transmitted and processed in the form of electronic information, using a computer network as a platform. By its nature, this electronic information is easy to duplicate, making it hard to tell an original from a copy, and information security has therefore become an important issue. In particular, building a computer network that satisfies the requirements of "shared computer resources," "multi-access," and "broad area networking" is essential to the establishment of a true highly sophisticated information society, but this includes factors that are in conflict with the goal of information security between involved parties. Encryption technology, which has been used primarily for military and diplomatic purposes in past human history, is attracting attention as an effective means for resolving this conflict.

Cryptography deals with exchanging information in such a way that the meaning thereof cannot be understood by anyone but the intended recipient. In cryptography, converting original text that can be understood by anyone (plaintext) into text that is meaningless to a third party (ciphertext) is called encryption, while returning the ciphertext to the original plaintext is called decryption, and the overall process of this encryption and decryption is called a cryptosystem. Secret encryption and decryption keys are used in the process of encryption and decryption, respectively. Since a secret decryption key is necessary during decryption, only someone who knows this decryption key can decrypt a ciphertext, so encryption allows the confidentiality of information to be preserved.

An encryption key may be the same as or different from a decryption key. A cryptosystem in which the two keys are the same is called a common or shared key cryptosystem, and the DES (Data Encryption Standards) employed by the Bureau of Standards of the US Department of Commerce is a typical example of this. Public key cryptosystems are proposed as an example of a cryptosystem in which the two keys are different. With a public key cryptosystem, each user (entity) that utilizes the cryptosystem generates a pair of keys, i.e., an encryption key and a decryption key, discloses the encryption key on a public key list, and keeps just the decryption key secret. An advantage of a public key cryptosystem is that the paired encryption key and decryption key are different and a one-way function is utilized, which makes it impossible for someone to deduce the decryption key from the encryption key.

A public key cryptosystem is a revolutionary cryptosystem in which the encryption key is disclosed, and satisfies the above three requirements necessary for the establishment of a sophisticated information society. A great deal of research has gone into these systems in an effort to utilize them in such fields as information communication technology, and a typical public key cryptosystem that has been proposed is the RSA cryptosystem. This RSA cryptosystem makes use of the difficulty of factoring large prime numbers using one-way functions. There are also public key cryptosystems that make use of the difficulty of solving discrete logarithm problems.

There is also a cryptosystem that makes use of personal ID (identity) information, such as the name or address of each entity. With this cryptosystem, a shared encryption key is generated between the sender and recipient on the basis of ID information. Cryptographic methods based on this ID information include (1) those that require pre-communication between the sender and recipient prior to the transmission of the ciphertext, and (2) those that do not require pre-communication between the sender and recipient prior to the transmission of the ciphertext. Since the second type of method does not require any pre-communication, it is very convenient for an entity, and is expected to become a mainstay of cryptosystems in the future.

The second type of scheme is called ID-NIKS (an ID-based non-interactive key sharing scheme), in which an encryption key is shared, without any pre-communication being performed, by using ID information about the communicating party. ID-NIKS does not require that a public key and secret key be exchanged between the sender and recipient, nor does it require a key list or service by a third party, allowing secure communication between any entities.

FIG. 9 of the accompanying drawings is a diagram showing the principle behind this ID-NIKS system The existence of a center that can be trusted is assumed, and a common key generation system is built around this center. In this diagram, ID information such as the name, address, and telephone number of an entity X, which is personal information of entity X, is expressed as $h(ID_x)$ using a hash function $h(\cdot)$. The center calculates secret information $S_{xi}$ as follows on the basis of public center information $\{PC_i\}$, secret center information $\{SC_i\}$, and entity X ID information $h(ID_x)$, and secretly distributes this calculated information to entity X.

$$S_{xi} = F_i(\{SC_i\}, \{PC_i\}, h(ID_x))$$

For communication with any other entity Y, entity X uses his own secret information $\{S_{Xi}\}$, public center information $\{PC_i\}$, and the other entity Y ID information $h(ID_Y)$ to generate a common key $K_{XY}$ for encryption and decryption as follows.

$K_{XY}=f(\{S_{Xi}\}, \{PC_i\}, h(ID_Y))$

Similarly, entity Y also generates a common key $K_{YX}$ for entity X. As long as the relationship $K_{XY}=K_{YX}$ holds true, then these keys $K_{XY}$ and $K_{YX}$ can be used as an encryption key and decryption key between entities X and Y.

With the public key cryptosystems discussed above, in the case of an RSA cryptosystem, for instance, this public key is over ten times as long as current telephone numbers, and is therefore far from simple. In contrast, with an ID-NIKS system, if each set of ID information is registered in the form of a roster, then a public key can be generated between itself and any other entity by referring to this roster. Therefore, if the ID-NIKS illustrated in FIG. 9 could be safely implemented, it would be possible to construct a convenient cryptosystem over a computer network to which many entities subscribe. It is for this reason that an ID-NIKS system is expected to be at the forefront of future cryptosystems.

It is preferable for ID-NIKS, in which common keys that serve as encryption and decryption keys are mutually shared by using the ID information of the communicating parties without any pre-communication being performed, to be sufficiently secure against attack involving a collusion of a plurality of entities, for example. However, this ID-NIKS has the problem that the secret parameters of the center can be revealed if enough people (entities) are in collusion since such attack method has been studied. Whether a cryptologically safe ID-NIKS system can be constructed is an important question for a sophisticated information society, and a search is underway for a more ideal encryption system.

SUMMARY OF THE INVENTION

An object of the present invention is to provide a novel cryptographic communication method and cryptographic communication system involving ID-NIKS system, with which secret key generation functions and key sharing functions are not separable, key sharing is probabilistically possible, and high degree of security is realized.

According to the first aspect of the present invention, there is provided a cryptographic communication method for communication of information between entities, in which a center generates and sends an entity-specific secret key to each entity, one entity uses a common key determined from its own entity-specific secret key sent from the center and a publicly known public key of the other entity to encrypt a plaintext into a ciphertext and transmits it to the other entity, and the other entity uses the same common key as the above-mentioned common key, determined from the second entity-specific secret key sent from the center to the other entity (the-other-entity-specific secret key) and the disclosed public key of the one entity, to decrypt the ciphertext back into a plaintext, characterized in that each-entity-specific secret key includes plural types of secret keys in which each of a plurality of numbers serves as a modulus, said plural types of secret keys being generated using respective entities' public keys and entity-specific random numbers, one entity uses a plural types of its own secret keys and the public key of the other entity or entities to generate the common key, and the other entity or entities use a plurality of its own secret keys and the public key of the one entity to generate said common key.

In the generation of the common key, the random number may be eliminated by addition over integer ring.

The random number may be a multidimensional random number vector.

The computational formulas for generating two types of the secret keys at the center may be as follows.

$\vec{s_i} = (A\vec{v_i} + \vec{\gamma_i}) \mod P$ $\vec{t_i} = (B\vec{v_i} - \vec{\gamma_i}) \mod Q$ Where Vector $s_i$: one secret key of entity i Vector $t_i$: the other secret key of entity i P and Q: publicly known prime numbers A and B: symmetric matrices composed of random numbers known only to the center Vector $\gamma_i$: a personal random number vector composed of random numbers The computational formulas for generating the common key for the entities may be as follows.

$A_{ij}' = {}^t\vec{s_i}\vec{v_j} \mod P$ $B_{ij}' = {}^t\vec{t_i}\vec{v_j} \mod Q$ $K_{ij} = A_{ij}' + B_{ij}'$ Where $K_{ij}$: common key generated by one entity i for another entity j Vector $v_j$: public key of entity j $A_{ij}'$ and $B_{ij}'$: intermediate values for generating the common key $K_{ij}$ k bits of the P and Q may be employed to satisfy the following formulas.

$P \equiv \delta \pmod{R}$ $Q \equiv \epsilon \pmod{R}$

Where

R: prime number of d bits $\delta$ and $\epsilon$: number of e bits k>d>e

The computational formulas for generating the common key for the entities may be given by the following equations.

$K_{ij}' = A_{ij}' + B_{ij}'$ $K_{ij}'' = K_{ij}' \mod R$ $A_{ij}' = {}^t\vec{s_i}\vec{v_j} \mod P$ $B_{ij}' = {}^t\vec{t_i}\vec{v_j} \mod Q$ $K_{ij} = \left\lfloor \frac{K_{ij}''}{2^{e+c}} \right\rfloor$ Where $K_{ij}$: common key generated by one entity i for another entity j $K_{ij}'$: an intermediate value for generating the common key $K_{ij}$ $K_{ij}''$: an intermediate value for generating the common key $K_{ij}$, i.e., remainder of dividing $K_{ij}'$ by R The public key for each entity may be determined by utilizing a hash function to calculate the each entity-specific information.

According to the second aspect of the present invention, there is provided an encryption method, in which secrets keys are sent to a plurality of entities, said secret keys being specific to the entities to which they are sent, and said entities use their own said entity specific keys to encrypt a plaintext into a ciphertext, characterized in that each-entity-specific secret key includes plural types of secret keys in which each of a plurality of numbers serves as a modulus, said plural types of secret keys being generated using its own entity-specific public key and its own entity-specific secret random number, and one entity encrypts a plaintext into a ciphertext using a common key generated using its own plural types of secret keys and a public key of the other entity, who is the intended recipient of the ciphertext.

According to the third aspect of the present invention, there is provided a cryptographic communication system including a plurality of entities, in which encryption into a ciphertext of a plaintext to be transmitted and decryption of the transmitted ciphertext back into an original plaintext are performed mutually between the plurality of entities, characterized in that the cryptographic communication system includes: a center that uses each-entity-specific public key and each-entity-specific secret random number to generate for each entity a plurality of types of secret keys in which each of a plurality of numbers serves as a modulus in relation to the plurality of types of secret keys, and sends these secret keys to each entity; and a plurality of entities, one of which uses a plurality of its own type of secret keys sent from the center and another-entity-specific public key to generate a common key for performing the encryption, and another of which uses a plurality of its own type of secret keys sent from the cente and an entity-specific key of the one entity for performing the decryption. The "another entity" is an entity which receives the ciphertext and decrypts it into the original plaintext.

According to the fourth aspect of the present invention, there is provided a cryptographic communication method for the communication of information between entities, in which an entity-specific secret key is generated by a center and sent to each entity from the center, one entity utilizes a common key determined from its own entity-specific secret key sent from the center and a publicly known public key of the other entity to encrypt a plaintext into a ciphertext and transmits it to the other entity, and the other entity utilizes the same common key as the above-mentioned common key, said common key being determined from its own entity-specific secret key sent from the center and the disclosed public key of the other entity, to decrypt the ciphertext back into a plaintext, characterized in that each entity-specific secret key includes a plurality of secret keys in which each of a plurality of numbers serves as a modulus, said plurality of secret keys being generated using a plurality of public keys of each entity and a plurality of each entity-specific random numbers, and each entity uses its own multiple secret keys and the plurality of public keys of the other entity to generate the common key.

When the common key is produced, the plurality of random numbers may be eliminated by addition over integer ring.

The plurality of random numbers may be a plurality of multidimensional random number vectors.

The computational formula for generating four secret keys at the center may be an equation (A) below, and the computational formula for generating the common key at each entity may be an equation (B) below.

$$\begin{aligned} \vec{s_{11,i}} &= (A_1 \vec{v_{1,i}} + \vec{\gamma_{1,i}}) \bmod P_1 \\ \vec{s_{22,i}} &= (A_2 \vec{v_{2,i}} + \vec{\gamma_{2,i}}) \bmod P_2 \\ \vec{s_{21,i}} &= (A_3 \vec{v_{1,i}} - \vec{\gamma_{2,i}}) \bmod P_3 \\ \vec{s_{12,i}} &= ({}^t A_3 \vec{v_{2,i}} - \vec{\gamma_{1,i}}) \bmod P_3 \end{aligned} \quad (A)$$

Where

Vector $S_{11,i}$: first secret key of entity i

Vector $S_{22,i}$: second secret key of entity i

Vector $S_{21,i}$: third secret key of entity i

Vector $S_{12,i}$: fourth secret key of entity i

Vector $v_{1,i}$: first public key of entity i

Vector $v_{2,i}$: second public key of entity i $P_1$, $P_2$, and $P_3$: publicly known prime numbers $A_1$ and $A_2$: secret symmetric matrices composed of random numbers known only to the center $A_3$: secret matrix composed of random numbers known only to the center Vector $\gamma_{1,i}$: first personal random number vector composed of random numbers Vector $\gamma_{2,i}$: second personal random number vector composed of random numbers $$K_{ij} = A_{11,ij}' + A_{22,ij}' + A_{21,ij}' + A_{12,ij}' \quad (B)$$

$$\begin{pmatrix} A'_{11,ij} = {}^t \vec{s_{11,i}} \vec{v_{1,j}} \bmod P_1 \\ A'_{22,ij} = {}^t \vec{s_{22,i}} \vec{v_{2,j}} \bmod P_2 \\ A'_{21,ij} = {}^t \vec{s_{21,i}} \vec{v_{2,j}} \bmod P_3 \\ A'_{12,ij} = {}^t \vec{s_{12,i}} \vec{v_{1,j}} \bmod P_3 \end{pmatrix}$$

Where $K_{ij}$: common key generated by one entity i for another entity j

Vector $v_{1,j}$: first public key of entity j

Vector $v_{2,j}$: second public key of entity j $A_{11,ij}'$, $A_{22,ij}'$, $A_{21,ij}'$, and $A_{12,ij}'$: intermediate values for generating the common key $K_{ij}$ There may be d number of public keys for each entity, the computational formula for generating $d^2$ number of the secret keys at the center is as follows (C), and the computational formula for generating the common key at each entity is as follows (D).

$$\vec{s_{yz,i}} = (A_{yz} \vec{v_{z,i}} + \vec{\gamma_{yz,i}}) \bmod P_{yz} \quad (C)$$

Where $A_{yz}$ (y and z=1, 2, . . . , d): a sub-matrix generated by partitioning an n×n symmetric matrix A in both the row and column directions at $n_1, n_2, \ldots, n_d$ (where $n = n_1 + n_2 + \ldots + n_d$)

Vector $S_{yz,i}$: $d^2$ number of secret keys of entity i

Vector $v_{z,i}$: a vector generated by dividing a public key column vector $v_i$ of entity i in the column direction into sizes of $n_1, n_2, \ldots, n_d$ Vector $\gamma_{yz,i}$: a vector generated by dividing a personal random number column vector $\gamma_{z,i}$ of entity i in the column direction into sizes of $n_1, n_2, \ldots, n_d$ $P_{yz}$: publicly known prime number $$K_{ij} = \sum_{y=1}^{d}\sum_{z=1}^{d} A'_{yz,ij}(A'_{yz,ij} = {}^{t}\overrightarrow{s_{yz,i}}\overrightarrow{v_{y,j}} \bmod P_{yz}) \quad (D)$$

Where $K_{ij}$: common key generated by one entity i for another entity j

Vector $v_{y,j}$: a vector generated by dividing a public key row vector $v_j$ of entity i in the row direction into sizes of $n_1, n_2, \ldots, n_d$ $A_{yz,ij}'$: $d^2$ number of intermediate values for generating the common key $K_{ij}$ A plurality of combinations may be used in which each combination includes d number of the public keys for each entity, and $d^2$ number of the secret keys for each entity.

The computational formula for generating 2d number of the secret keys at the center is as follows (E), and the computational formula for generating the common key at each entity is as follows (F).

$$\left. \begin{array}{l} \overrightarrow{s_{r,i}} = (A_r\overrightarrow{u_{r+1,i}} + \overrightarrow{\gamma_{r,i}})\bmod P_r \\ \overrightarrow{t_{r,i}} = (B_r\overrightarrow{u_{r,i}} - \overrightarrow{\gamma_{r+1,i}})\bmod P_r \end{array} \right\} \quad (E)$$

Where

Vector $S_{r,i}$: d number of secret keys of entity i

Vector $t_{r,i}$: d number of secret keys of entity i $A_r$: a secret matrix composed of random numbers known only to the center $B_r = {}^{t}A_r$ Vector $V_{r,i}$: d number of public keys of entity i Vector $\gamma_{r,i}$: d number of personal random number vectors composed of random numbers $P_r$: publicly known prime number $$K_{ij} = \sum_{r=1}^{d}(A'_{r,ij} + B'_{r,ij}) \quad (F)$$

$$\left( \begin{array}{l} A'_{r,ij} = {}^{t}\overrightarrow{s_{r,i}}\overrightarrow{v_{r,j}} \bmod P_r \\ B'_{r,ij} = {}^{t}\overrightarrow{t_{r,i}}\overrightarrow{v_{r+1,j}} \bmod P_r \end{array} \right)$$

Where $K_{ij}$: common key generated by one entity i for another entity j

Vector $v_{r,j}$: d number of public keys of entity j $A_{r,ij}'$ and $B_{r,ij}'$: an intermediate value for generating the common key $K_{ij}$ The plurality of public keys for each entity may be determined by utilizing a hash function to calculate the specific information of each entity.

According to the fifth aspect of the present invention, there is provided an encryption method, in which secret keys are generated at a center and sent to a plurality of entities from the center, said secret keys being specific to the entities to which they are sent, and said entities use their own said entities' specific keys to encrypt a plaintext into a ciphertext, characterized in that each-entity-specific secret key of each entity includes a plurality of secret keys in which each of a plurality of numbers serves as a modulus, said plurality of secret keys being generated using a plurality of its own entity-specific public keys and a plurality of its own entity-specific secret random numbers, and one entity encrypts a plaintext into a ciphertext using a common key generated using these plurality of its own secret keys and a plurality of public keys of the other entity, who is the intended recipient of the ciphertext.

According to the sixth aspect of the present invention, there is provided a cryptographic communication system, in which encryption into a ciphertext of a plaintext to be transmitted, and decryption of the transmitted ciphertext back into a plaintext, are performed mutually between a plurality of entities, characterized in that the cryptographic communication system includes a center for using a plurality of each-entity-specific public keys and a plurality of each-entity-specific secret random numbers to generate for each entity a plurality of secret keys in which each of a plurality of numbers serves as a modulus, and for sending these plural secret keys to each entity, and a plurality of entities each of which uses its own plural secret keys sent from the center and a plurality of public keys specific to another entity, who is an entity to receive a ciphertext or an entity to send a ciphertext, to generate a common key for performing the encryption processing and decryption processing.

First, let us discuss the conditions for realizing an ID-NIKS system, and the conditions for secure ID-NIKS. Here, i, j, y, and z express entities, $v_i$ is the public key of entity i which in most cases is the ID hash value, $s_i$ is the secret key of entity i, and $K_{ij}$ is the common key with entity j determined by entity i.

The following three conditions must be met for an ID-NIKS system to be realized.

Condition 1 (Secret Key Generation Condition)

The center is able to determine the corresponding secret key $s_i$ from the public key $v_i$ of entity i using a secret key generation function $f(\cdot)$.

$$s_i = f(v_i)$$

Condition 2 (Common Key Generation Condition)

The common key $K_{ij}$ can be determined from the secret key $s_i$ of entity i and the public key $v_j$ of entity j using a common key generation function $g(\cdot)$.

$$K_{ij} = g(s_i, v_j)$$

Condition 3 (Key Sharing Condition)

The common key $K_{ij}$ generated by entity i for entity j is equal to the common key $K_{ji}$ generated by entity j for entity i.

$$K_{ij} = K_{ji}$$

Therefore, a key sharing function $F(\cdot)$ in which the variables are $v_i$ and $v_j$, obtained by substituting the secret key generation function $f(\cdot)$ into the common key generation function $g(\cdot)$, is a symmetric function.

$$F(v_i, v_j) = F(v_j, v_i)$$

Where $F(v_i, v_j) = g(f(v_i), (v_j)) = g(s_i, v_j)$

The term "separable" here is defined as follows.

Definition: If we let a suitable commutative method be $\bigcirc$, when the following formula is always satisfied, then the function f is separable by $\bigcirc$.

$$f(x+y) = f(x) \bigcirc f(y)$$

For example, $f(x) = ax$ and $f(x) = a^x$ are separable as shown below.

$$f(x+y) = a(x+y) = ax + ay = f(x) + f(y)$$

$$f(x+y)=a^{x+y}=a^x \cdot a^y=f(x) \cdot f(y)$$

Meanwhile, f(x)=ax+b is not separable as shown below.

$$f(x+y)=a(x+y)+b=ax+ay+b$$

$$f(x)+f(y)=ax+b+ay+b=ax+ay+2b$$

Thus, f(x+y)≠f(x)+f(y)

When the public key $v_z$ of an entity z that is the object of attack is expressed by linear combination of public keys $v_i$ of conspirators, and furthermore when either one of the secret key generation function or key sharing function is separable in polynomial time, then the secret key and common key of the entity can be forged without finding the center's secrets. This method of attack has in the past been called a linear attack.

It used to be thought that it was easy to express a public key $v_z$ by linear combination, but methods have also been developed with which it is not always easy to express the public key $v_z$ of a target entity by linear combination. In view of this, linear attack should be considered as two parts: a first-stage attack portion in which the public key $v_z$ is expressed as a linear combination, and a second-stage attack portion in which the function is separated and a key is forged. In the following description, this first stage of linear attack will be distinguished by being called combination attack, while the second stage will be called separation attack. The linear attack will refer to this combination attack and separation attack jointly.

The following theorems apply for separation attack.

Theorem 1 (separation attack against secret key):

A secret key $s_z$ can be forged in polynomial time by separation attack using a secret key when a public key $v_z$ is subjected to combination attack using integer coefficients, when the secret key generation function is separable in polynomial time by an operation ○, and when the inverse with respect to the operation ○ is found in polynomial time.

Theorem 2 (separation attack against common key):

A common key $K_{y2}$ can be forged in polynomial time by separation attack using only a common key when a public key $v_z$ is subjected to combination attack using integer coefficients, when the secret key generation function is separable in polynomial time by an operation ○, and when the inverse with respect to the operation ○ is found in polynomial time.

The following conditions 4 and 5 should be met in order to build an ID-NIKS system that is secure against the separation attacks discussed above.

Condition 4 (Security of Secret Key Against Separation Attack)

It is difficult to separate the secret key generation function f in polynomial time.

Condition 5 (Security of Common Key Against Separation Attack)

It is difficult to separate the key sharing function F in polynomial time.

This condition 5 is extremely stringent, and simply means that if the functional form at the key sharing stage is separable, i.e., the key sharing function is separable☐C then the system is not secure, regardless of intermediate calculations. For instance, a product-sum type of ID-NIKS and a power product type of ID-NIKS do not satisfy this condition.

With the present invention, the secret key generation function and the key sharing function are inseparable, and key sharing is probabilistically possible. Inseparability is accomplished by calculation over finite fields in which a large prime number serves as the modulus, and then eliminating the random numbers by addition over integer ring. The basis of security with the present invention is that when the size of a coefficient is limited, it is difficult to express any vector by the linear combination of the vectors of the conspirators. The collusion threshold is also raised by the use of random number vectors specific to each entity.

Also, the present invention involves the use of a plurality of public keys for each entity, and these plurality of public keys are combined to eliminate random numbers, so the complexity of the random number elimination is increased and higher security is achieved. Furthermore, because the random numbers are divided, the problem of digits being carried up is ameliorated.

BRIEF DESCRIPTION OF THE DRAWINGS

FIGS. 3 and 4 illustrate numerical examples according to the first embodiment;

FIGS. 5 and 6 illustrate numerical examples of the second embodiment according to the present invention;

FIG. 9 illustrates the principle behind ID-NIKS.

DETAILED DESCRIPTION OF THE INVENTION

Figure 1:
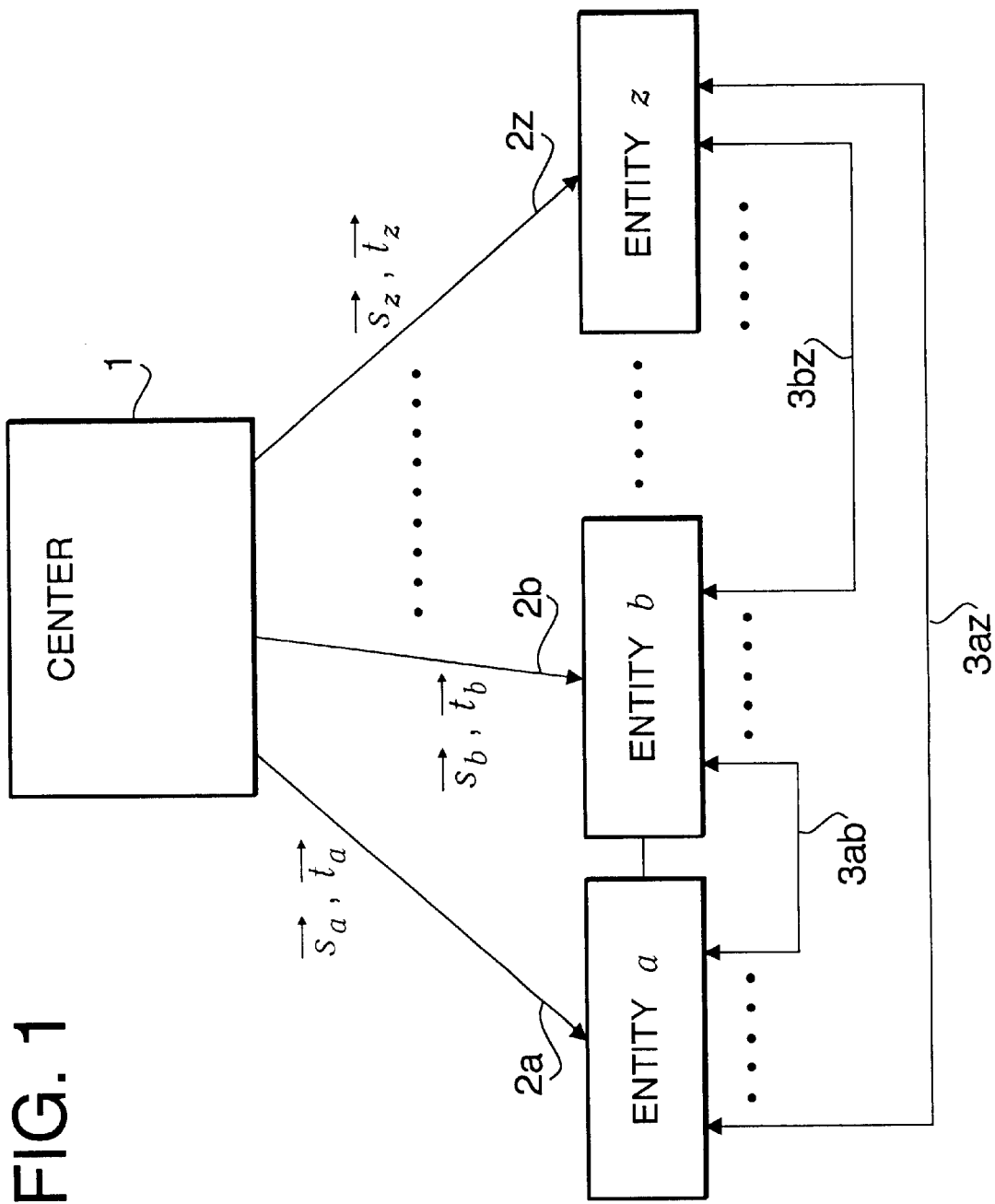
FIG. 1 schematically illustrates the structure of the cryptographic communication system according to the present invention.

Referring to FIG. 1, illustrated is a schematic structure of the cryptographic communication system according to the present invention. A center 1 that can be trusted to conceal information is set up. A public institution is an example of this center 1. The center 1 is connected to a plurality of entities a, b, . . . , z, which are the users of this cryptosystem, by private channels 2a, 2b, . . . , 2z, and secret key information from the center 1 is transmitted to the various entities a, b, . . . , z via these private channels 2a, 2b, . . . , 2z. Channels 3ab, 3az, 3bz, . . . are provided between each two entities, and a ciphertext produced by the encryption of information is transferred back and forth between the entities via these channels 3ab, 3az, 3bz, . . .

FIRST EMBODIMENT

A first embodiment of the ID-NIKS according to the present invention will now be described. This embodiment deals with a basic scheme in which a personal random number is added to the secret key, and the random number portion is eliminated during sharing.

Preprocessing at the Center 1

The center 1 prepares the following public keys and secret keys, and discloses the public keys.

Public keys P and Q: large prime numbers of k bits

Secret keys A and B: n×n symmetric matrices composed of k-bit random numbers

Vector $\gamma_i$: personal random number vector composed of 1-bit random numbers Also disclosed at the same time from the center 1 is a one-way function vector h(·) that generates an n-dimensional public key vector composed of m-bit positive integers from the ID of an entity concerned, which is specific information about that entity. Here, the inner product of the random number vector $\gamma_i$ and the public key vector $v_j$ of any entity should not exceed P and Q. Further, to simplify the discussion, parameter b will be set as in the following formula 1, and we will consider a case in which b>0. This b is a parameter related to the probability of key sharing and security, as will be discussed below. Approximate suitable values are k=1240, l=200, m=1000, n=1000, and b=30.

$$b = k - (l + m + \log_2 n) \quad (1)$$

Registration Processing of an Entity

Upon receiving a request for registration from entity i, the center 1 determines the vector $s_i$ and vector $t_i$ according to the following formulas 2 and 3 using the prepared keys and the public key vector $v_i$ (=vector $h(ID_i)$) of entity i, privately sends the determined vector $s_i$ and vector $t_i$ to entity i, and completes the registration. The "mod" here is the modulus of a binomial operator. Specifically, "a mod P" expresses an operation for finding the remainder of dividing a by P.

$$\vec{s}_i = (A\vec{v}_i + \vec{\gamma}_i) \bmod P \quad (2)$$

$$\vec{t}_i = (B\vec{v}_i - \vec{\gamma}_i) \bmod Q \quad (3)$$

It should be noted that the above formula 3 may instead be expressed as in the following formula 3', involving subtraction over integer ring in the final stage of key sharing. In this case, however, the common key $K_{ij}$ (discussed below) may end up being a negative value. In the description that follows, the vector $t_i$ will be determined by formula 3.

$$\vec{t}_i = (B\vec{v}_i + \vec{\gamma}_i) \bmod Q \quad (3')$$

Processing for Generation of Common Key Between Entities

An entity i performs the following calculations to determine a common key $K_{ij}$ with an entity j. First, $A_{ij}'$ and $B_{ij}'$ are determined according to formulas 4 and 5 using modulus P and modulus Q, respectively, and then $K_{ij}$ is obtained by the calculation in formula 6 over integer ring.

$$A_{ij}' = {}^t\vec{s}_i \vec{v}_j \bmod P \quad (4)$$

$$B_{ij}' = {}^t\vec{t}_i \vec{v}_j \bmod Q \quad (5)$$

$$K_{ij} = A_{ij}' + B_{ij}' \quad (6)$$

Figure 2:
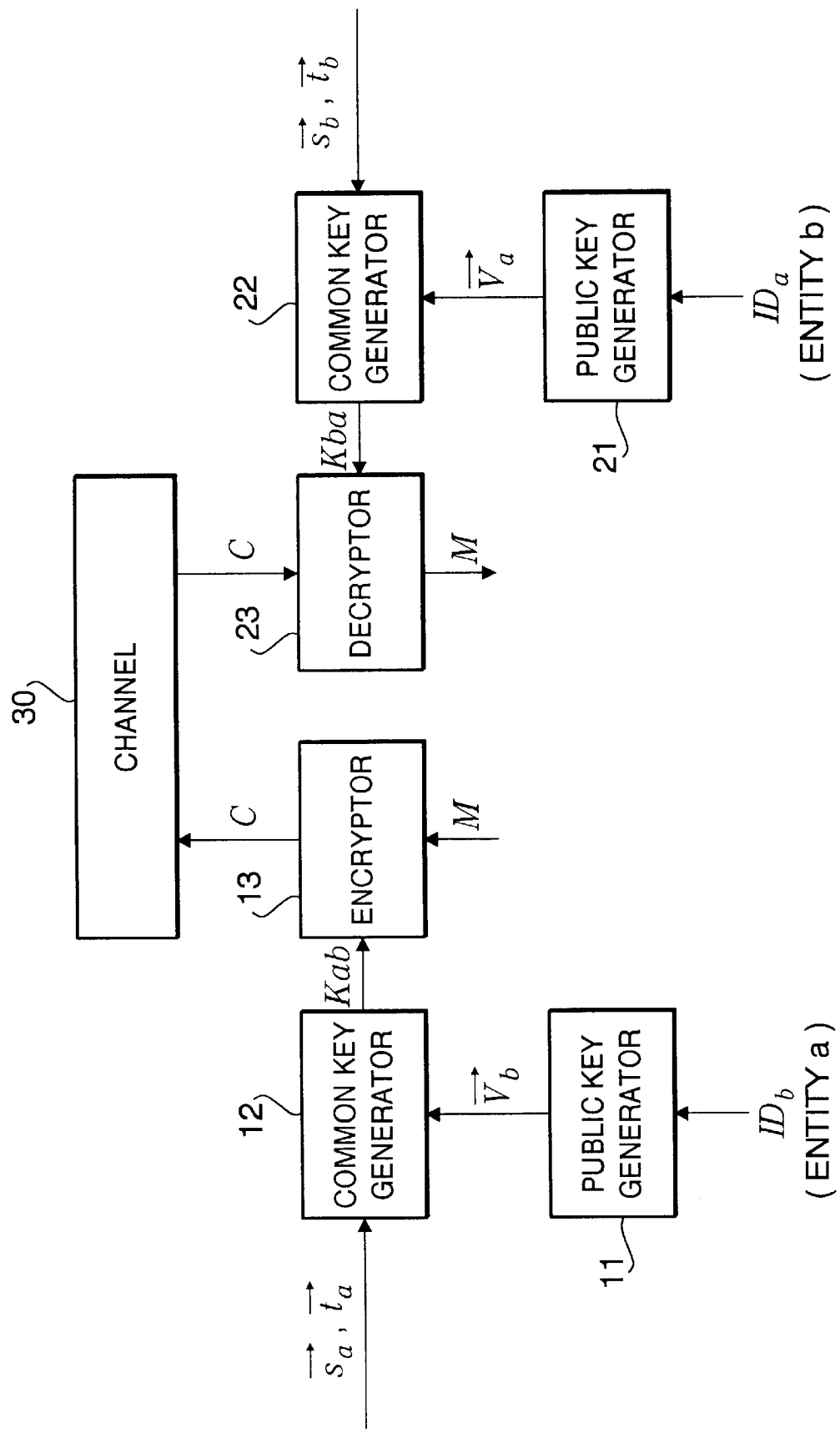
FIG. 2 illustrates communication of information between two entities in the cryptographic communication system shown in FIG. 1.

The communication of information between entities in the cryptosystem discussed above will now be described. Referring to FIG. 2, illustrated is communication of information between two entities a and b. In this example, the entity a encrypts a plaintext (message) M into a ciphertext C and sends it to the entity b, and the entity b decrypts this ciphertext C back into the original plaintext M.

The entity a side is equipped with a public key generator 11 that inputs personal identity information $ID_b$ of the entity b and uses a hash function to obtain a vector $v_b$ (public key), a common key generator 12 that generates a common key $K_{ab}$ with the entity b, which the entity a asks for, on the basis of the secret vectors $s_a$ and $t_a$ sent from the center 1 and the vector $v_b$, which is the public key provided from the public key generator 11, and an encryptor 13 that uses the common key $K_{ab}$ to encrypt the plaintext M into the ciphertext C and outputs it to a channel 30.

The entity b side is equipped with a public key generator 21 that inputs personal identity information $ID_a$ of the entity a and uses a hash function to obtain a vector $v_a$ (public key), a common key generator 22 that generates a common key $K_{ba}$ with the entity a, which the entity b asks for, on the basis of the secret vectors $s_b$ and $t_b$ sent from the center 1 and the vector $v_a$, which is the public key provided from the public key generator 21, and a decryptor 23 that uses the common key $K_{ba}$ to decrypt the ciphertext C into the plaintext M inputted from the channel 30 and outputs the result.

The operation will now be described. When the entity a attempts to send information to the entity b, first, the personal identity information $ID_b$ of the entity b is inputted to the public key generator 11 to obtain the vector $v_b$ (public key), and the vector $v_b$ thus obtained is sent to the common key generator 12. The vectors $s_a$ and $t_a$ determined according to formulas 2 and 3 are inputted to the common key generator 12 from the center 1. The common key $K_{ab}$ is then determined according to formulas 4 to 6, and sent to the encryptor 13. At the encryptor 13, this common key $K_{ab}$ is used to encrypt the plaintext M into the ciphertext C, and the ciphertext C is sent via the channel 30.

The ciphertext C that has been sent through the channel 30 is inputted to the decryptor 23 of the entity b. The personal identity information $ID_a$ of the entity a is inputted to the public key generator 21 to obtain the vector $v_a$ (public key), and the vector $v_a$ thus obtained is sent to the common key generator 22. The vectors $s_b$ and $t_b$ determined by according to formulas 2 and 3 are inputted to the common key generator 22 from the center 1. The common key $K_{ba}$ is then determined according to formulas 4 to 6, and sent to the decryptor 23. At the decryptor 23, this common key $K_{ba}$ is used to decrypt the ciphertext C into the original plaintext M.

The feasibility of this method will now be proven.

It is shown below that if b in the above formula 1 is increased, $K_{ij} = K_{ji}$ at a high probability. This is given as formulas 7 and 8.

$$A_{ij}'' = {}^t\vec{v}_i A \vec{v}_j \bmod P \quad (7)$$

$$B_{ij}'' = {}^t\vec{v}_i B \vec{v}_j \bmod Q \quad (8)$$

Given this, since $A_{ij}'$ is as shown in formula 9, either formula 10-1 or formula 10-2 holds true over integer ring.

$$A_{ij}' = {}^t\vec{s}_i \vec{v}_j \bmod P \quad (9)$$
$$= {}^t(A\vec{v}_i + \vec{\gamma}_i)\vec{v}_j \bmod P$$
$$= ({}^t\vec{v}_i A \vec{v}_j + {}^t\vec{\gamma}_i \vec{v}_j) \bmod P$$

$$A_{ij}' = \begin{cases} A_{ij}'' + {}^t\vec{\gamma}_i \vec{v}_j & (A_{ij}'' + {}^t\vec{\gamma}_i \vec{v}_j < P) \quad (10\text{-}1) \\ A_{ij}'' + {}^t\vec{\gamma}_i \vec{v}_j - P & (A_{ij}'' + {}^t\vec{\gamma}_i \vec{v}_j \geq P) \quad (10\text{-}2) \end{cases}$$

Here, the inner product of the transposed vector of the random number vector γi and the public key vector $v_j$ (the second term on the right side in formula 9) has added a (l+m)-bit number n times, and is a number whose magnitude is less than $2^{l+m} \cdot n$, and since $A_{ij}''$ can be k bits, adding the inner product of the transposed vector of $\gamma_i$ and the vector $v_j$ allows the probability that the whole will be greater than the modulus P to be estimated at roughly $(2^{l+m} \cdot n)/2^k = 1/2^b$. Therefore, the probability that formula 10-1 will hold true is approximately $1 - 1/2^b$.

Similarly, $B_{ij}'$ is expressed by formula 11, either formula 12-1 or formula 12-2 holds true over integer ring, and formula 12-1 holds true at a probability of approximately $1 - 1/2^b$.

$$B'_{ij} = {}^t\overrightarrow{T_i v_j} \bmod Q \qquad (11)$$

$$= {}^t(B\overrightarrow{v_i} - \overrightarrow{\gamma_i})\overrightarrow{v_j} \bmod Q$$

$$= ({}^t\overrightarrow{v_i}B\overrightarrow{v_j} + {}^t\overrightarrow{\gamma_i v_j}) \bmod Q$$

$$B'_{ij} = \begin{cases} B''_{ij} - {}^t\overrightarrow{\gamma_i v_j} & (B''_{ij} + {}^t\overrightarrow{\gamma_i v_j} \geq 0) \\ B''_{ij} - {}^t\overrightarrow{\gamma_i v_j} + Q & (B''_{ij} + {}^t\overrightarrow{\gamma_i v_j} < 0) \end{cases} \qquad \begin{matrix}(12\text{-}1)\\ \\ (12\text{-}2)\end{matrix}$$

Therefore, $K_{ij}$ is expressed by one of the following formulas 13-1, 13-2, 13-3, and 13-4.

$$K_{ij} = A''_{ij} + B''_{ij} \qquad (13\text{-}1)$$

$$K_{ij} = A''_{ij} + B''_{ij} - P \qquad (13\text{-}2)$$

$$K_{ij} = A''_{ij} + B''_{ij} + Q \qquad (13\text{-}3)$$

$$K_{ij} = A''_{ij} + B''_{ij} - P + Q \qquad (13\text{-}4)$$

The probability that formula 13-1 will hold true is approximately $(1-1/2^b)^2 \approx 1-1/2^{b-1}$, so formula 13-1 will hold true at an extremely high probability if b is made large enough. The probability that formulas 13-2 and 13-3 will hold true is approximately $(1/2^b)\cdot(1-1/2^b)$ for both, and the probability that formula 13-4 will hold true is approximately $1/2^{2b}$, and all of these are extremely low probabilities.

This is exactly the same with $K_{ji}$, where formula 13-1 holds true at an extremely high probability of approximately $(1-1/2^b)^2$. Therefore, the probability that the two entities i and j can share a key, that is, the probability that $K_{ij}=K_{ji}$, is approximately $(1-1/2^b)^4 \approx 1-1/2^{b-2}$. Thus, it can be seen that a key can be shared at an extremely high probability in this first embodiment. In the case of the above-mentioned suitable values, b=30 is sufficiently large, so the probability of failure to share a key is only about $1/2^{28}$.

Here, numerical examples of the first embodiment, in which we let n=1 (both the matrix and the vector are scalar), are shown in FIGS. 3 and 4. P, Q, A, and B are decimal and ten-digit, while the vectors $v_i$, $v_j$, $\gamma_i$, and $\gamma_j$ (actually scalar) are each decimal and three-digit. Setting the number of digits in this way keeps the inner product of the vectors from reaching the number of digits of P and Q. In this example, the inner product has 6 digits, i.e., 3 digits×3 digits, so the first four digits are the same for $A_{ij}$ and $A_{ji}$ and for $B_{ij}$ and $B_{ji}$.

Next, let us consider the security of the encryption scheme in this first embodiment.

Security of Secret Key Against Separation Attack

Because there are two secret keys with this scheme, there are two secret key generation functions $f_P$ and $f_Q$, as shown in formulas 14 to 16. However, we will let the right side of formula 14 be a function that generates an n-dimensional vector having a random number less than $2^l$ as a component.

$$\overrightarrow{\gamma} = \overrightarrow{\varrho}(2^l) \qquad (14)$$

$$f_P(\overrightarrow{x}) \equiv A\overrightarrow{x} + \overrightarrow{\gamma}(\bmod P) \qquad (15)$$

$$f_Q(\overrightarrow{x}) \equiv B\overrightarrow{x} - \overrightarrow{\gamma}(\bmod Q) \qquad (16)$$

We obtain the following formula 17 by substituting the vector x+vector y into the secret key generation function $f_P$. Meanwhile, formula 18 holds true.

$$f_P(\overrightarrow{x} + \overrightarrow{y}) \equiv A(\overrightarrow{x} + \overrightarrow{y}) + \overrightarrow{\varrho}(2^l)(\bmod P) \qquad (17)$$

$$f_P(\overrightarrow{x}) + f_P(\overrightarrow{y}) \equiv A\overrightarrow{x} + \overrightarrow{\varrho}(2^l) + A\overrightarrow{y} + \overrightarrow{\varrho}(2^l) \qquad (18)$$

$$\equiv A(\overrightarrow{x} + \overrightarrow{y}) + \overrightarrow{\varrho}(2^l) + \overrightarrow{\varrho}(2^l)(\bmod P)$$

Thus, we can see that with formula 18 the range over which the random number portion can be taken is twice as large as compared to formula 17. The effect of the random numbers becomes greater if the variables are further increased, so the secret key generation function $f_P$ cannot be separated. Similarly, the secret key generation function $f_Q$ is also inseparable. Specifically, the situation is as shown in the following formulas 19 and 20, and condition 4 is met.

$$f_P(\overrightarrow{x} + \overrightarrow{y}) \not\equiv f_P(\overrightarrow{x}) + f_P(\overrightarrow{y})(\bmod P) \qquad (19)$$

$$f_Q(\overrightarrow{x} + \overrightarrow{y}) \not\equiv f_Q(\overrightarrow{x}) + f_Q(\overrightarrow{y})(\bmod Q) \qquad (20)$$

Security of Common Key Against Separation Attack

The key sharing function F is expressed by the following formulas 21 to 23.

$$\mathcal{F}(\overrightarrow{x}, \overrightarrow{y}) = ({}^t\overrightarrow{x}A\overrightarrow{y} \bmod P) + ({}^t\overrightarrow{x}B\overrightarrow{y} \bmod Q) \qquad (21)$$

$$\mathcal{F}(\overrightarrow{x}, \overrightarrow{y}) = {}^t\overrightarrow{x}A\overrightarrow{y} - \mu(\overrightarrow{x}, \overrightarrow{y})P + {}^t\overrightarrow{x}B\overrightarrow{y} - \nu(\overrightarrow{x}, \overrightarrow{y})Q$$

$$= {}^t\overrightarrow{x}(A + B)\overrightarrow{y} - \mu(\overrightarrow{x}, \overrightarrow{y})P - \nu(\overrightarrow{x}, \overrightarrow{y})Q$$

$$\mu(\overrightarrow{x}, \overrightarrow{y}) = \left\lfloor \frac{{}^t\overrightarrow{x}A\overrightarrow{y}}{P} \right\rfloor \qquad (22)$$

$$\nu(\overrightarrow{x}, \overrightarrow{y}) = \left\lfloor \frac{{}^t\overrightarrow{x}B\overrightarrow{y}}{Q} \right\rfloor \qquad (23)$$

The first term in formula 21 is a separable function, but the second and third terms are inseparable functions (with the round-off functions expressed in formulas 22 and 23, either f(x+y)=f(x)+f(y) or f(x)+f(y)+1 holds true, but separation is generally impossible if we consider multi-variable combination, and thus the function $\mu$ and the function $\nu$ that make use of a round-off function are inseparable), so this key sharing function F is inseparable. Specifically, the relationship of formula 24 is exhibited, and condition 5 is met.

$$\mathcal{F}(\overrightarrow{a}, \overrightarrow{x} + \overrightarrow{y}) \neq \mathcal{F}(\overrightarrow{a}, \overrightarrow{x}) + \mathcal{F}(\overrightarrow{a}, \overrightarrow{y}) \qquad (24)$$

Security Against Combination Attack Over Finite Fields

If we let the following formula 25 express a matrix V containing the public key vectors $v_i$ of n number of linearly independent conspirators, then formulas 26 and 27 can be determined using P and Q as moduli for any vector $v_z$.

$$V = [\overrightarrow{v_1} | \overrightarrow{v_2} | \ldots | \overrightarrow{v_n}] \qquad (25)$$

$$\overrightarrow{u_{z(P)}} \equiv V^{-1}\overrightarrow{v_z}(\bmod P) \qquad (26)$$

$$\overrightarrow{u_{z(Q)}} \equiv V^{-1}\overrightarrow{v_z}(\bmod Q) \qquad (27)$$

As shown by formulas 28 and 29, the vector $v_z$ can be expressed by linear combination by n number of conspirators.

$$\vec{v_z} \equiv V\vec{u_{z(P)}} \pmod P \tag{28}$$

$$\vec{v_z} \equiv V\vec{u_{z(Q)}} \pmod Q \tag{29}$$

Here, if we give the following formula 30, the vector $s_z'$ can be determined as shown in formula 31 using P as the modulus.

$$\vec{u_{z(P)}} = {}^t(u_{z1(P)}, u_{z2(P)}, \ldots, u_{zn(P)}) \tag{30}$$

$$\begin{aligned}\vec{s_z'} &\equiv u_{z1(P)}\vec{s_1} + \ldots + u_{zn(P)}\vec{s_n} \\ &\equiv u_{z1(P)}A\vec{u_1} + u_{z1(P)}\vec{\gamma_x} + \ldots + u_{zn(P)}A\vec{u_n} + u_{zn(P)}\vec{\gamma_n} \\ &\equiv A(u_{z1(P)}\vec{u_x} + \ldots + u_{zn(P)}\vec{u_n}) + u_{z1(P)}\vec{\gamma_x} + \ldots + u_{zn(P)}\vec{\gamma_n} \\ &\equiv A\vec{u_z} + \Gamma\vec{u_{z(P)}} \pmod P\end{aligned} \tag{31}$$

Where, $$\Gamma = [\vec{\gamma_1} | \vec{\gamma_2} | \ldots | \vec{\gamma_n}]$$

Here, if we provide the following formula 32, this is expressed as in formula 33.

$$\vec{\gamma_{z(P)}'} = \Gamma\vec{u_{z(P)}} \tag{32}$$

$$\vec{s_z'} \equiv A\vec{u_z} + \vec{\gamma_{z(P)}'} \pmod P \tag{33}$$

Similarly, if. we provide the following formula 34, the vector $t_z'$ can be determined as shown in formula 35 using Q as the modulus.

$$\vec{\gamma_{z(Q)}'} = \Gamma\vec{u_{z(Q)}} \tag{34}$$

$$\begin{aligned}\vec{t_z'} &\equiv u_{z1(Q)}\vec{t_1} + \ldots + u_{zn(Q)}\vec{t_n} \\ &\equiv B\vec{v_z} - \Gamma\vec{u_{z(Q)}} \\ &\equiv B\vec{v_z} - \vec{\gamma_{z(Q)}'} \pmod Q\end{aligned} \tag{35}$$

The random number portion can be eliminated when the random number term in formula 33 is equal to the random number term in formula 35, and its value is less than (1+b) bits. Accordingly, it is conceivable that the vector $s_z'$ determined through collusion would be used in place of the true secret key vector $s_z$ of entity z. Nevertheless, it cannot be substituted for the true secret key vector $s_z$ for the following two reasons.

Reason 1: The left side of formula 26 and the left side of formula 27 generally consist of k bits, so the random number term of formula 33 and the random number term of formula 35 are sufficiently large.

Reason 2: The left side of formula 26 is not equal to the left side of formula 27, so the random number term of formula 33 and the random number term of formula 35 are not equal, and the random number portion cannot be eliminated.

Therefore, this first embodiment can be considered secure against combination attack over finite fields by n number of conspirators.

Security Against Combination Attack Over Integer Ring

It is conceivable that a combination attack over integer ring would be possible if a Euclidean algorithm were applied by n' number of conspirators equal to or over (n+1) in number. Specifically, a coefficient vector $u_z'$ (component expressed by formula 38) that satisfies formula 37 over integer ring can be determined if a matrix V containing the public key vectors $v_i$ of n' number of conspirators is given as the following formula 36.

$$V = [\vec{v_1} | \vec{v_2} | \ldots | \vec{v_{n'}}] \tag{36}$$

$$\vec{v_z} = V\vec{u_z} \tag{37}$$

$$\vec{u_z} = {}^t(u_{z1}, u_{z2}, \ldots, u_{zn'}) \tag{38}$$

Next, the vector $s_z'$ and the vector $t_z'$ are determined according to formulas 39 and 40.

$$\begin{aligned}\vec{s_z'} &\equiv u_{z1}\vec{s_1} + \ldots + u_{zn'}\vec{s_{n'}} \\ &\equiv A\vec{u_z} + \vec{\gamma_z'} \pmod P\end{aligned} \tag{39}$$

$$\begin{aligned}\vec{t_z'} &\equiv u_{z1}\vec{t_1} + \ldots + u_{zn'}\vec{t_{n'}} \\ &\equiv B\vec{v_z} - \vec{\gamma_z'} \pmod Q\end{aligned} \tag{40}$$

Where, $$\vec{\gamma_z'} = \Gamma\vec{u_z}$$

If the vector $s_z'$ and vector $t_z'$ thus determined are compared to the true secret key vector $s_z$ and secret key vector $t_z$, the random number term vectors $\gamma_z'$ are both larger, but when the values of $|u_{zi}|$ are all small, and the size of the vectors $\gamma_z'$ is less than (1+b) bits, the relationship of the following formula 41 holds true with respect to any public key vector $v_j$, and the vectors $s_z'$ and $t_z'$ play the same role as the true secret key vectors $s_z$ and $t_z$.

$${}^t\vec{\gamma_z'}\vec{v_j} < P \tag{41}$$

If the conspirators decide an entity z to be attacked and are (fortunately) able to find their vectors $v_i$ and coefficient vector $u_z$ so that the vector $v_z$ can be expressed by combination of small coefficients, then this system is not always secure. Nevertheless, finding this coefficient vector $u_z$ is generally very difficult. Thus, when the size of the coefficient is limited, the basis of security is the fact that it is difficult to express any public key vector by linear combination of the conspirators public key vectors.

Probability that Combination Attack Over Integer Ring will Work

As discussed above, an attack by conspirators will work if the value of $|u_{zi}|$ is small in relation to all the components $u_{zi}$ of the coefficient vector $u_z$. Since it is not easy to consider the probability that the entity z to be attacked will be decided on and that the vector $v_z$ can be expressed by the linear combination of a public key using a small coefficient, herein we will shift our focus and discuss the probability of successful attack by concentrating on the total number of public keys with which an attack will succeed when N number of conspirators gather together. We will assume that the attack will work if the size of the coefficient can be limited to w ($\leq$b) bits. In this case, the probability that a common key produced using a forged secret key will coincide with the correct common key is $1-1/2^{b-w}$.

When the attack is attempted by one person, the public keys of $2^{2w}$ people can be expressed by the vector $v_1$ of one person if a coefficient whose size is limited to w bits is used. If we let a gathering of these public. keys be $V_1$, then $V_1$ is expressed by the following formula 42.

$$V_1 = \{u_1\vec{v}_1 | u_1 = 0, 1, \ldots, 2^w - 1\} \quad (42)$$

When the attack is colluded by two people, similarly, the public keys of $2^{2w}$ people can be expressed using the vector $v_1$ and the vector $v_2$. If we let a gathering of these public keys be $V_2$, then $V_2$ is expressed by the following formula 43.

$$V_2 = \{u_1\vec{v}_1 + u_2\vec{v}_2 | u_1, u_2 = 0, 1, \ldots, 2^w - 1\} \quad (43)$$

Similarly, when the attack is planed by N people, the public keys of a maximum of $2^{Nw}$ people can be expressed by the linear combination of the vector $v_1$, vector $v_2$, ..., vector $V_N$. In order to choose conspirators most efficiently, the vector $v_i$ should be selected such that the condition of formula 44 is met.

$$\vec{v}_i \notin V_{i-1} \quad (44)$$

The total number of public keys is $2^{mn}$, while the maximum number of public keys with which an attack by N conspirators will work is $2^{Nw}$, so the probability that a combination attack will work against an arbitrary entity is $2^{Nw}/2^{mn}$. Furthermore, the probability that a true common key can be forged for use with an arbitrarily selected other entity is $(2^{Nw}/2^{mn}) \cdot (1 - 1/2^{b-w})$ If we let N be the collusion threshold n of a conventional product-sum type of NIKS, then even if w=b, the probability that a combination attack will work is $1/2^{(m-b)n}$, and is only $1/2^{970000}$ when the proper value is used.

Lower Limit to Collusion Threshold at Which a Combination Attack Over Integer Ring Will Work With a combination attack against a conventional product-sum type of NIKS, there is no limit to the size of the coefficient vector, so if n number of linearly independent public key vectors are chosen, all $2^{mn}$ of the public key can be expressed through linear combination by these n conspirators. However, if the size of the coefficient is limited to w bits, then the total number of gathered vectors $V_N$ expressed by linear combination using the public keys of N people is just $2^{Nw}$ at most.

Assuming that there are N people in collusion, N must satisfy the condition of the following formula 45, that is, formula 46, in order for all of the $2^{mn}$ public keys of these N people to be expressed by linear combination.

$$2^{Nw} \geq 2^{mn} \quad (45)$$

$$N \geq mn/w \quad (46)$$

Thus, it can be concluded that this first embodiment is an encryption system with which the lower limit of the collusion threshold is m/w times larger than that of a power product type of NIKS system.

Actually, the vector $u_z$ that satisfies the above formula 37 will not be unique even though it is known to be the vector $v_z \in V_N$, and finding among them a vector whose coefficients are all smaller than m bits is believed to be exceedingly difficult.

When the proper value is used, if the conspirators are anticipating that the forgery of the common key with an arbitrary entity will be successful at a probability of at least $(1 - 1/2^{10})$, then they can only take a size up to w=20, and it can be seen that the collusion threshold will be m/w=1000/20=50, which is about 50 times higher than that of an ordinary product-sum type of NIKS system.

SECOND EMBODIMENT

A second embodiment of the ID-NIKS according to the present invention will now be described. This is a modification to the first embodiment.

It has been shown in the first embodiment that attack will be difficult if b is set low. On the other hand, if b is set low, there is a lower probability that the proper entities can correctly share keys. Specifically, with the first embodiment, feasibility and security are in a trade-off relationship in which b is a parameter.

The second embodiment is an encryption system that allows keys to be correctly shared even if b is made further smaller, which is an improvement over the first embodiment. In this second embodiment, a practical ID-NIKS system that is extremely powerful against combination attack can be constructed by lowering b to the limit of zero.

Preprocessing at the Center 1

The center 1 prepares the following public keys and secret keys, and discloses the public keys.

Public keys R: prime number of d bits

P and Q: large prime numbers of k bits

Secret keys A and B: n×n symmetric matrices composed, of k-bit random numbers

Vector $\gamma_i$: personal random number vector composed of 1-bit random numbers The center 1 generates a relatively small prime number R of d bits in the above-mentioned public keys, and generates prime numbers P and Q of k bits so as to satisfy the following formulas 47 and 48.

$$P \equiv \delta \pmod{R} \quad (47)$$

$$Q \equiv \epsilon \pmod{R} \quad (48)$$

Here, $\delta$ and $\epsilon$ are numbers of e bits, and k>d>e.

Also disclosed at the same time is a one-way function vector $h(\cdot)$ that generates an n-dimensional public key vector composed of m-bit positive integers from the ID of an entity. Here, $b = k - (1 + m + \log_2 n)$ ($\geq 0$) is set to be extremely small. Approximate suitable values are k=1210, l=200, m=1000, n=1000, b=0, d=500, e=50, and c=50 (the meaning of c will be discussed below).

Registration Processing of an Entity

Upon receiving a request for registration from an entity i, the center 1 determines the vector $s_i$ and vector $t_i$ according to the following formulas 49 and 50 using the prepared keys and the public key vector $v_i$ (=vector $h(ID_i)$) of the entity i, privately sends the determined vector $s_i$ and vector $t_i$ to the entity i, and completes the registration.

$$\vec{s}_i = (A\vec{v}_i + \vec{\gamma}_i) \bmod P \quad (49)$$

$$\vec{t}_i = (B\vec{v}_i - \vec{\gamma}_i) \bmod Q \quad (50)$$

Processing for Generation of Common Key Between Entities

The entity i performs the following calculations to determine a common key $K_{ij}$ with an entity j. First, $A_{ij}'$ and $B_{ij}'$ are determined according to formulas 51 and 52 using modulus P and modulus Q, respectively, and then $K_{ij}'$ is obtained by the calculation in formula 53 over integer ring. The $K_{ij}'$ thus determined is divided by R and the remainder $K_{ij}''$ is determined as shown in formula 54. The remainder $K_{ij}''$ is then rounded off as shown in formula 55 to obtain $K_{ij}$.

$$A_{ij}' = {}^t\vec{s_i}\vec{v_j} \bmod P \quad (51)$$

$$B_{ij}' = {}^t\vec{t_i}\vec{v_j} \bmod Q \quad (52)$$

$$K_{ij}' = A_{ij}' + B_{ij}' \quad (53)$$

-continued $$K''_{ij} = K'_{ij} \bmod R \quad (54)$$

$$K_{ij} = \left\lfloor \frac{K''_{ij}}{2^{e+c}} \right\rfloor \quad (55)$$

The operation in which information is communicated between entities is the same as in the first embodiment, and so will not be described here.

The feasibility of this scheme will now be proven.

It is shown below that if c is large enough, $K_{ij}=K_{ji}$ at a high probability. Just as in the first embodiment, $K_{ij}'$ is expressed by one of the following formulas 56-1, 56-2, 56-3, and 56-4.

$$K_{ij}'=A_{ij}''+B_{ij}'' \quad (56\text{-}1)$$

$$K_{ij}'=A_{ij}''+B_{ij}''-P \quad (56\text{-}2)$$

$$K_{ij}'=A_{ij}''+B_{ij}''+Q \quad (56\text{-}3)$$

$$K_{ij}'=A_{ij}''+B_{ij}''-P+Q \quad (56\text{-}4)$$

$K_{ij}''$ is expressed by one of the following formulas 57-1, 57-2, 57-3, and 57-4.

$$K_{ij}''\equiv A_{ij}''+B_{ij}'' (\bmod R) \quad (57\text{-}1)$$

$$K_{ij}''\equiv A_{ij}''+B_{ij}''-\delta (\bmod R) \quad (57\text{-}2)$$

$$K_{ij}''\equiv A_{ij}''+B_{ij}''+\epsilon (\bmod R) \quad (57\text{-}3)$$

$$K_{ij}''\equiv A_{ij}''+B_{ij}''-\delta+\epsilon (\bmod R) \quad (57\text{-}4)$$

$\delta$ and $\epsilon$ are e bits, so by rounding off the last e+c bits, $K_{ij}=K_{ji}$ at a probability of $1-1/2^c$ or higher. Strictly speaking, the probability that carrying down will result from a subtraction of $\delta$ and the probability that carrying up will result from an addition of $\epsilon$ must be taken into account, but in both cases this probability is $1/2^{d-e}$, and is extremely small if d is made large enough. For instance, when the proper value is used, this value is no more than $1/2^{450}$. Thus, it can be seen that keys can be shared at an extremely high probability with the second embodiment by increasing c.

FIGS. 5 and 6 show numerical examples of the second embodiment, where n=1 (both the matrix-and the vector are scalar). P, Q, A, and B are decimal and ten-digit, while R is decimal and eight-digit, and the vectors $v_i$, $v_j$, $\gamma_i$, and $\gamma_j$ (actually scalar) are each decimal and five-digit. $\delta$ and $\epsilon$ are decimal and one-digit, and in the final stage they are decimal numbers with the lower two digits-rounded off.

Next, let us consider the security of the encryption system in this second embodiment.

The remainder operation in which R is the modulus contributes only to increasing the key sharing probability without a loss of security, and the second embodiment is based on exactly the same security as the first embodiment. Also, with the second embodiment, an inseparable rounding-off operation is further used in the final stage of the common key generation processing, so security against attack using a common key is enhanced.

Furthermore, key sharing is possible with any of formulas 56-1 to 56-4, regardless of the size of b, if c is set large enough, and b can be set as low as zero. For example, when the suitable values are used, b=0, and therefore w=0, in which case the value of the right side of formula 46 becomes infinitely large, and attack by collusion becomes unfeasible. In this case, the inner product of the public key vector $v_j$ and the random number vector $\gamma_i$ is k bits, which covers all the digits.

Figure 7:
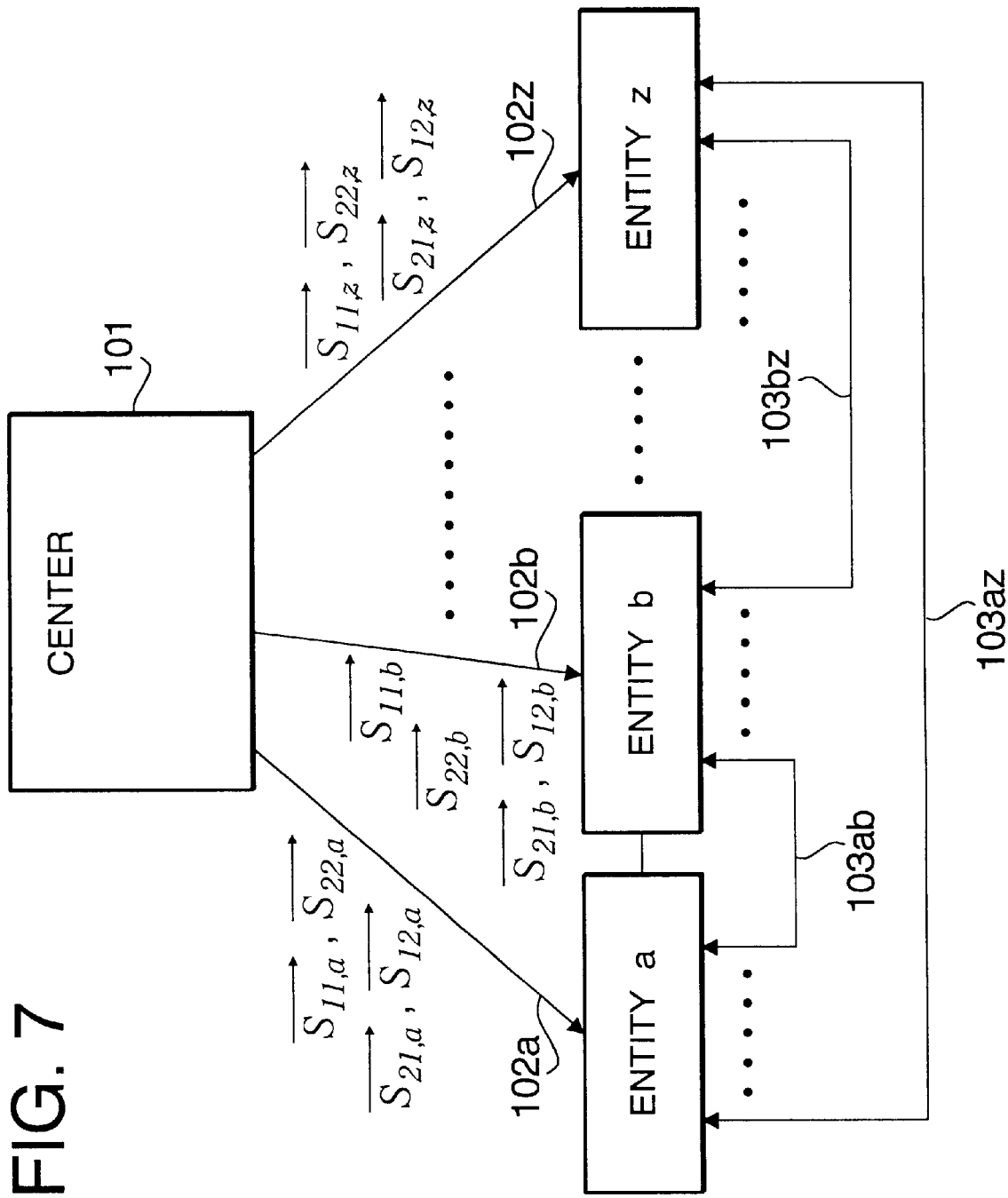
FIG. 7 is a diagram illustrating the structure of another cryptographic communication system according to the present invention.

FIG. 7 is a diagram illustrating the structure of another cryptographic communication system according to the present invention. A center 101 and a plurality of entities a, b, ..., z are connected to each other by channels 102a, 102b, ..., 102z, as well as channels 103ab, 103bz, ... and 103az, like the system shown in FIG. 1. These channels are substantially the same as FIG. 1 so that description thereof is omitted here.

THIRD EMBODIMENT

A third embodiment of the ID-NIKS of the present invention will now be described. In this embodiment, two public keys are used for each entity.

Preprocessing at the Center 101

A center 101 prepares the following public keys and secret keys, and discloses the public keys.

Public keys $P_1$, $P_2$, and $P_3$: large prime numbers of k bits

Secret keys $A_1$: n×n symmetric matrices composed of random numbers belonging to GF $(P_1)$ $A_2$: n×n symmetric matrices composed of random numbers belonging to GF $(P_2)$ $A_3$: n×n matrices composed of random numbers belonging to GF $(P_3)$ Vectors $\gamma_{1,i}$ and $\gamma_{2,i}$: personal random number vector composed of 1-bit random numbers Also disclosed at the same time are two one-way function vectors $h_1(\cdot)$ and $h_2(\cdot)$ that each generate an n-dimensional public key vector composed of m-bit positive integers from the ID of an entity, which is specific information about the entity. The parameter b here is set as in the following formula, and we will consider a case in which b>0.

$$b=k-(l+m+\log_2 n)$$

Registration Processing of an Entity

Upon receiving a request for registration from an entity i, the center 101 determines the first secret key vector $s_{11,i}$, second secret key vector $s_{12,i}$, third secret key vector $s_{21,i}$, and fourth secret key vector $s_{22,i}$ for the entity i according to the following formulas 58 to 61 using the prepared keys and the first public key vector $v_{1,i}$ (=vector $h_1(ID_i)$) and second public key vector $v_{2,i}$ (=vector $h_2(ID_i)$) of the entity i. The center 101 then privately sends the determined vectors to the entity i, and completes the registration. The "mod" here is the modulus of a binomial operator. Specifically, "a mod P" expresses an operation for finding the remainder of dividing a by P.

$$\vec{s_{11,i}}=(A_1\vec{v_{1,i}}+\vec{\gamma_{1,i}}) \bmod P_1 \quad (58)$$

$$\vec{s_{22,i}}=(A_2\vec{v_{2,i}}+\vec{\gamma_{2,i}}) \bmod P_2 \quad (59)$$

$$\vec{s_{21,i}}=(A_3\vec{v_{1,i}}-\vec{\gamma_{2,i}}) \bmod P_3 \quad (60)$$

$$\vec{s_{12,i}}=({}^tA_3\vec{v_{2,i}}-\vec{\gamma_{1,i}}) \bmod P_3 \quad (61)$$

Processing for Generation of Common Key Between Entities

The entity i performs the following calculations to determine a common key $K_{ij}$ with an entity j. First, $A_{11,ij}'$ and $A_{22,ij}'$ are determined according to formulas 62 and 63 using modulus $P_1$ and modulus $P_2$, respectively, then $A_{21,ij}'$ and $A_{12,ij}'$ are determined according to formulas 64 and 65, respectively, using modulus $P_3$, and then $K_{ij}$ is obtained by the calculation in formula 66 over integer ring.

$$A_{11,ij}'={}^t\vec{s_{11,i}}\vec{v_{1,j}} \bmod P_1 \quad (62)$$

$$A_{22,ij}{'} = {}^t\overrightarrow{s_{22,i}}\overrightarrow{v_{2,j}} \bmod P_2 \quad (63)$$

$$A_{21,ij}{'} = {}^t\overrightarrow{s_{21,i}}\overrightarrow{v_{2,j}} \bmod P_3 \quad (64)$$

$$A_{12,ij}{'} = {}^t\overrightarrow{s_{12,i}}\overrightarrow{v_{1,j}} \bmod P_3 \quad (65)$$

$$K_{ij} = A_{11,ij}{'} + A_{22,ij}{'} + A_{21,ij}{'} + A_{12,ij}{'} \quad (66)$$

Here, if b is sufficiently large, $K_{ij}=K_{ji}$ at an overwhelmingly high probability.

Figure 8:
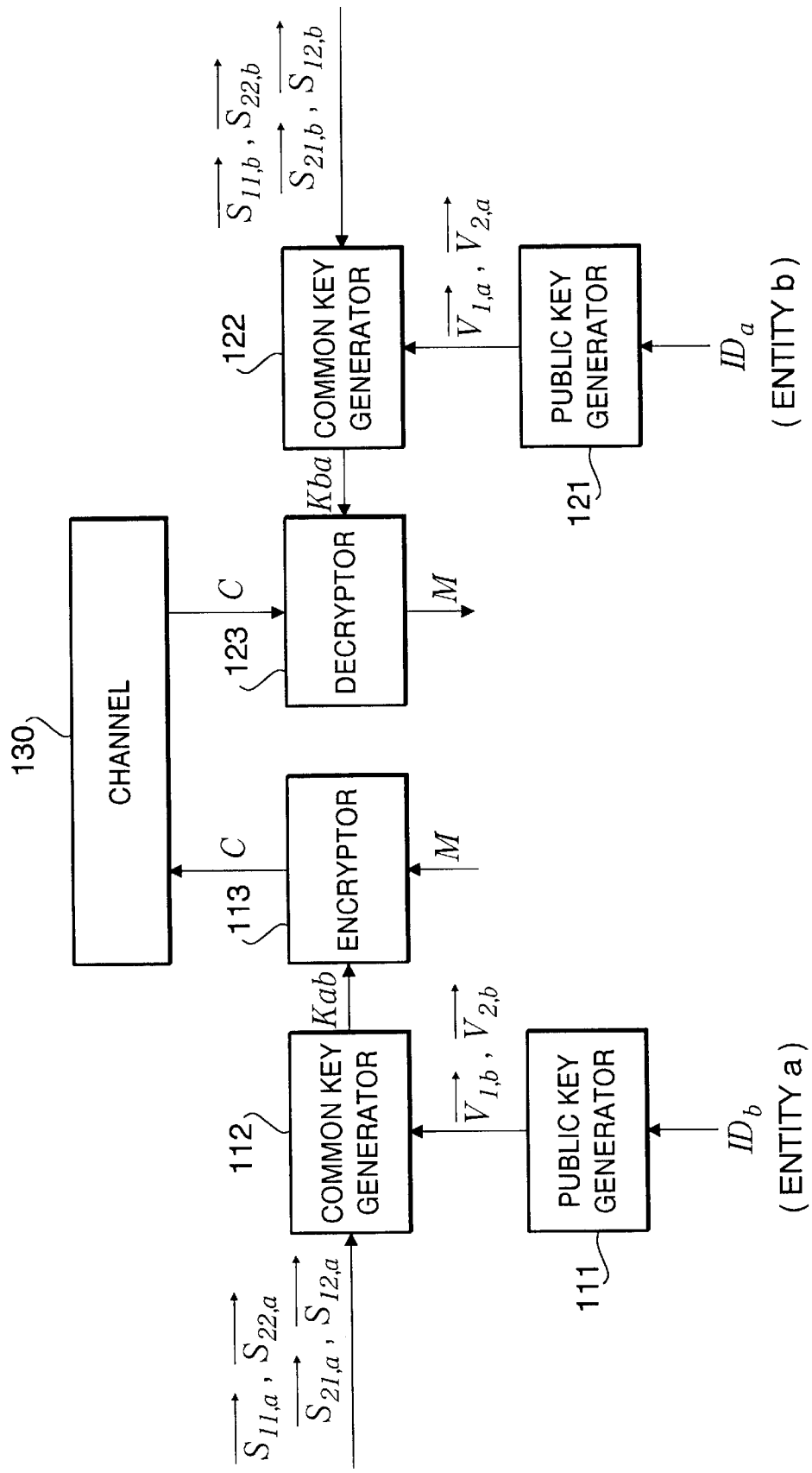
FIG. 8 is a diagram illustrating communication of information between two entities in the cryptographic communication system shown in FIG. 7.

The communication of information between entities in the cryptosystem discussed above will now be described. FIG. 8 illustrates communication of information between particular two entities a and b. In this example, the entity a encrypts a plaintext M into a ciphertext C and sends it to the entity b, and the entity b decrypts this ciphertext C back into the original plaintext M.

The entity a side is equipped with a public key generator 111 that inputs personal identity information $ID_b$ of the entity b and uses a hash function to obtain vectors $v_{1,b}$ and $v_{2,b}$ (public keys), a common key generator 112 that generates a common key $K_{ab}$ with the entity b, which the entity a asks for, on the basis of the secret vectors $s_{11,a}$, $s_{22,a}$, $s_{21,a}$, and $s_{12,a}$ sent from the center 101 and the vectors $v_{1,b}$ and $v_{2,b}$, which are the public keys provided from the public key generator 111, and an encryptor 113 that uses the common key $K_{ab}$ to encrypt the plaintext M into the ciphertext C and outputs it to a channel 130.

The entity b side is equipped with a public key generator 121 that inputs personal identity information $ID_a$ of the entity a and uses a hash function to obtain vectors $v_{1,a}$ and $v_{2,a}$ (public keys), a common key generator 122 that generates a common key $K_{ba}$ with the entity a, which the entity b asks for, on the basis of the secret vectors $s_{11,b}$, $s_{22,b}$, $s_{21,b}$, and $s_{12,b}$ sent from the center 101 and the vectors $v_{1,a}$ and $v_{2,a}$, which are the public keys from the public key generator 121, and a decryptor 123 that uses the common key $K_{ba}$ to decrypt the ciphertext C into the plaintext M inputted from the channel 130 and outputs the result.

The operation will now be described. When the entity a attempts to send information to the entity b, first, the personal identity information $ID_b$ of the entity b is inputted to the public key generator 111 to obtain the vectors $v_{1,b}$ and $v_{2,b}$ (public keys), and the vectors $v_{1,b}$ and $v_{2,b}$ and thus obtained are sent to the common key generator 112. The vectors $s_{11,a}$, $s_{22,a}$, $s_{21,a}$, and $s_{12,a}$ determined by the center 101 according to formulas 58 to 61 are inputted to the common key generator 112. The common key $K_{ab}$ is then determined according to formulas 62 to 66, and sent to the encryptor 113. At the encryptor 113, this common key $K_{ab}$ is used to encrypt the plaintext M into the ciphertext C, and the ciphertext C is sent via the channel 130.

The ciphertext C that has been sent through the channel 130 is inputted to the decryptor 123 of the entity b. The personal identity information $ID_a$ of the entity a is inputted to the public key generator 121 to obtain the vectors $v_{1,a}$ and $v_{2,a}$ (public keys), and the vectors $v_{1,a}$ and $v_{2,a}$ thus obtained are sent to the common key generator 122. The vectors $s_{11,b}$, $s_{22,b}$, $s_{21,b}$, and $s_{12,b}$ determined by the center 101 according to formulas 58 to 61 are inputted to the common key generator 122. The common key $K_{ba}$ is then determined according to formulas 62 to 66, and sent to the decryptor 123. At the decryptor 123, this common key $K_{ba}$ is used to decrypt the ciphertext C into the plaintext M.

The formal expression of this encryption system will now be described. In order to facilitate an understanding of the encryption system in this third embodiment, the formulas 58 to 61 given above are defined by corresponding sub-matrices as shown below. It should be noted that a multiplying operation applied to the matrices and vectors in this formal expression is different from an ordinary multiplying operation applied to matrices in that addition is not carried out over partitions between sub-matrices. The symbols and/or numerals in ( ) designate a module.

$$\left( \begin{array}{c|c} \overrightarrow{s_{11,i}} & \overrightarrow{s_{12,i}} \\ \hline \overrightarrow{s_{21,i}} & \overrightarrow{s_{22,i}} \end{array} \right) = \left( \begin{array}{c|c} A_1(P_1) & {}^t A_3(P_3) \\ \hline A_3(P_3) & A_2(P_2) \end{array} \right) \left( \begin{array}{c} \overrightarrow{v_{1,i}} \\ \hline \overrightarrow{v_{2,i}} \end{array} \right) + \left( \begin{array}{c|c} \overrightarrow{\gamma_{1,i}} & -\overrightarrow{\gamma_{1,i}} \\ \hline -\overrightarrow{\gamma_{2,i}} & \overrightarrow{\gamma_{2,i}} \end{array} \right)$$

The above-mentioned formulas 62 to 65 are expressed as follows.

$$\left( \begin{array}{c|c} A'_{11,ij} & A'_{12,ij} \\ \hline A'_{21,ij} & A'_{22,ij} \end{array} \right) = {}^t\left( \begin{array}{c|c} \overrightarrow{s_{11,i}}(P_1) & \overrightarrow{s_{12,i}}(P_3) \\ \hline \overrightarrow{s_{21,i}}(P_3) & \overrightarrow{s_{22,i}}(P_2) \end{array} \right) \left( \begin{array}{c} \overrightarrow{v_{1,i}} \\ \hline \overrightarrow{v_{2,i}} \end{array} \right)$$

For matrix A, if the operation of determining the sum of all the sub-matrices of A is expressed as $\Sigma A$, then the common key $K_{ij}$ can be expressed as follows.

$$K_{ij} = \sum \left( \begin{array}{c|c} A'_{11,ij} & A'_{12,ij} \\ \hline A'_{21,ij} & A'_{22,ij} \end{array} \right)$$

According to this formal expression, the third embodiment is considered to be a system that makes use of a symmetric matrix with the modulus being also included.

FOURTH EMBODIMENT

A fourth embodiment of the ID-NIKS according to the present invention will now be described. This embodiment deals with a generalized system in which d number of public keys are used for each entity. Specifically, in this fourth embodiment, d number of public keys are used, with their size being expressed by $n_1, n_2, \ldots, n_d$, respectively. An n×n symmetric matrix A is readied, which is divided in the row and column directions into $n_1, n_2, \ldots, n_d$ to express sub-matrices $A_{yz}$ (y and z are 1, 2, ..., d). Here, we will let n be $n_1+n_2+\ldots+n_d$.

Because A is a symmetric matrix, $A_{yz}={}^tA_{zy}$ holds true with respect to each (y, z) sub-matrix of the matrix A. We will assume that the moduli are the same within each sub-matrix, and $P_{yz}=P_{zy}$ is satisfied in relation to the modulus. Furthermore, since the random number term must be eliminated during common key generation, we will let the vector o be a zero vector that satisfies the following formula 67. In this case, the secret key of the entity i is expressed by $d^2$ number of formulas.

$$\sum_{z=1}^{d} \overrightarrow{\gamma_{z,i}} = \vec{o} \quad (67)$$

Preprocessing at the Center 101

The center 101 prepares the following public keys and secret keys, and discloses the public keys.

Public keys $P_{yz}$: large prime numbers of k bits

Secret keys $A_{yz}$: $n_y \times n_z$ matrices composed of random numbers belonging to GF $(P_{yz})$ Vectors $\gamma_{z,i}$: n-dimensional personal random number vectors composed of 1-bit random numbers (y and z=1, 2, ..., d)

Also disclosed at the same time is a one-way function vector h(·) that generates an n-dimensional public key vector composed of m-bit positive integers from the ID of an entity. The parameter $b_r$ (r=1, 2, ..., d) is set as shown by the following formula, and we will consider a case when $b_r>0$.

$$b_r = k - (l + m + \log_2 n_r)$$

Registration Processing of an Entity

Upon receiving a request for registration from an entity i, the center 101 determines $d^2$ number of secret key vectors $s_{yz,i}$ for the entity i according to the following formula 68 using the prepared keys and the public key vector $v_i$ (=vector $h(ID_i)$) of the entity i, privately sends these vectors to the entity i, and completes the registration. The vector $v_{z,i}$ and vector $\gamma_{yz,i}$ express vectors obtained by dividing the column vector $v_i$ and vector $\gamma_{z,i}$ in the column direction, respectively, at a size of $n_1, n_2, \ldots, n_d$. The "mod" here is the modulus of a binomial operator.

$$\vec{s_{yz,i}} = (A_{yz}\vec{v_{z,i}} + \vec{\gamma_{yz,i}}) \bmod P_{yz} \tag{68}$$

Processing for Generation of Common Key Between Entities

The entity i performs the following calculations to determine a common key $K_{ij}$ with an entity j. First, $A'_{yz,ij}$ is determined according to formula 69 using the respective moduli $P_{yz}$, and $K_{ij}$ is then obtained by the calculation of formula 70 over integer ring.

$$A'_{yz,ij} = {}^t\vec{s_{yz,i}}\vec{v_{y,j}} \bmod P_{yz} \tag{69}$$

$$K_{ij} = \sum_{y=1}^{d}\sum_{z=1}^{d} A'_{yz,ij} \tag{70}$$

Proof will now be given for the key sharing in the fourth embodiment ($K_{ij}=K_{ji}$ holds true). If we substitute formula 68 into formula 69, we obtain the following formulas 71 and 72. When all of the $b_r$ values are large enough, the first formula of formula 72 holds true at a high probability. In this case, the random number term will be eliminated from formula 67 by calculation of formula 70, so $K_{ij}=K_{ji}$ holds true at a high probability.

$$A'_{yz,ij} = ({}^t\vec{v_{z,i}}A_{zy}\vec{v_{y,j}} + {}^t\vec{\gamma_{yz,i}}\vec{v_{y,j}}) \bmod P_{yz} \tag{71}$$

$$= \begin{cases} {}^t\vec{v_{z,i}}A_{zy}\vec{v_{y,j}} \bmod P_{yz} + {}^t\vec{\gamma_{yz,i}}\vec{v_{y,j}} \\ {}^t\vec{v_{z,i}}A_{zy}\vec{v_{y,j}} \bmod P_{yz} + {}^t\vec{\gamma_{yz,i}}\vec{v_{y,j}} - P_{yz} \end{cases} \tag{72}$$

The operation in which information is communicated between entities is the same as in the third embodiment, and so will not be described here.

If we use the above-mentioned formal expression for this fourth embodiment, the $d^2$ number of secret keys of the entity i can be all be expressed together as follows.

$$\begin{pmatrix} \vec{s_{11,i}} & \cdots & \vec{s_{1d,i}} \\ \vdots & \ddots & \vdots \\ \vec{s_{d1,i}} & \cdots & \vec{s_{dd,i}} \end{pmatrix} = \begin{pmatrix} A_{11}(P_{11}) & \cdots & A_{1d}(P_{1d}) \\ \vdots & \ddots & \vdots \\ A_{d1}(P_{d1}) & \cdots & A_{dd}(P_{dd}) \end{pmatrix} \begin{pmatrix} \vec{v_{1,i}} \\ \vdots \\ \vec{v_{d,i}} \end{pmatrix} + \begin{pmatrix} \vec{\gamma_{11,i}} & \cdots & \vec{\gamma_{1d,i}} \\ \vdots & \ddots & \vdots \\ \vec{\gamma_{d1,i}} & \cdots & \vec{\gamma_{dd,i}} \end{pmatrix}$$

The common key $K_{ij}$ can be expressed as follows.

$$K_{ij} = \sum {}^t\begin{pmatrix} \vec{s_{11,i}} & \cdots & \vec{s_{1d,i}} \\ \vdots & \ddots & \vdots \\ \vec{s_{d1,i}} & \cdots & \vec{s_{dd,i}} \end{pmatrix} \begin{pmatrix} \vec{v_{1,j}} \\ \vdots \\ \vec{v_{d,j}} \end{pmatrix}$$

FIFTH EMBODIMENT

A fifth embodiment of the ID-NIKS of the present invention will now be described. This embodiment relates to a generalized system in which a plurality of sets of the public keys in the fourth embodiment are used. Specifically, the fifth embodiment is a generalized system in which the random numbers are eliminated only when a plurality of sets (c sets) of the public keys from the fourth embodiment are readied and the sum of all of these c sets is taken. In the following example, we will describe a case in which c=2, d number of public keys are used, with their size being expressed by $n_1, n_2, \ldots, n_d$, and e number of public keys are used with their size being expressed by $n_1'', n_2'', \ldots, n_e''$.

Preprocessing at the Center 101

The center 101 prepares the following public keys and secret keys, and discloses the public keys.

Public keys $P_{yz}$, $Q_{yz}$: large prime numbers of k bits

Secret keys $A_{yz}$: $n_y \times n_z$ matrices composed of random numbers belonging to GF($P_{yz}$)

$B_{yz}$: $n_y \times n_z$ matrices composed of random numbers belonging to GF($Q_{yz}$)

Vectors $\gamma_{z,i}$: n-dimensional personal random number vectors composed of 1-bit random numbers Vectors $\delta_{z,i}$: n-dimensional personal random number vectors composed of 1-bit random numbers Registration Processing of an Entity Upon receiving a request for registration from an entity i, the center 101 determines $d^2$ number of secret key vectors $s_{yz,i}$ and $e^2$ number of secret key vectors $t_{yz,i}$ for the entity i according to the following formulas 73 and 74 using the prepared keys and the public key vector $v_i$ (=vector $h(ID_i)$) of the entity i, privately sends these vectors to the entity i, and completes the registration. The vector $v_{z,i}$ and vector $\gamma_{yz,i}$ express vectors obtained by dividing the column vector $v_i$ and vector $\gamma_{z,i}$, respectively, in the column direction at a size of $n_1, n_2, \ldots, n_d$, the vector $v_{z,i}''$ and vector $\delta_{yz,i}$ express vectors obtained by dividing the column vector $v_i$ and vector $\delta_{z,i}$, respectively, in the column direction at a size of $n_1'', n_2'', \ldots, n_e''$, and the "mod" here is the modulus of a binomial operator. Here, the vector $v_i$ is different only in the method of division, and the same vectors are used for both formulas 73 and 74.

$$\vec{s_{yz,i}} = (A_{yz}\vec{v_{z,i}} + \vec{\gamma_{yz,i}}) \bmod P_{yz} \tag{73}$$

(y, z=1, 2, ..., d)

$$t_{yz,i} = (B_{yz}\vec{v_{z,i}''} + \vec{\delta_{yz,i}}) \bmod Q_{yz} \quad (y, z = 1, 2, \ldots, e) \tag{74}$$

The random number terms should be determined in such a manner that the following formula 75 is satisfied. By doing so, the random number terms will be eliminated only when the above two sets of keys are used.

$$\sum_{z=1}^{d} \vec{\gamma_{z,i}} + \sum_{z=1}^{e} \vec{\delta_{z,i}} = \vec{o} \tag{75}$$

Processing for Generation of Common Key Between Entities

The entity i performs the following calculations to determine a common key $K_{ij}$ with an entity j. First, $A'_{yz,ij}$ and $B'_{yz,ij}$ are determined according to formulas 76 and 77 using the respective moduli $P_{yz}$ and $Q_{yz}$, and $K_{ij}$ is then obtained by the calculation of formula 78 over integer ring.

$$A'_{yz,ij} = {}^t\vec{s_{yz,i}}\vec{v_{y,j}} \bmod P_{yz} \quad (y, z = 1, 2, \ldots, d) \tag{76}$$

$$B'_{yz,ij} = {}^t\vec{t_{yz,i}}\vec{v_{y,j}}' \bmod Q_{yz} \quad (y, z = 1, 2, \ldots, e) \tag{77}$$

$$K_{ij} = \sum_{y=1}^{d}\sum_{z=1}^{d} A'_{yz,ij} + \sum_{y=1}^{e}\sum_{z=1}^{e} B'_{yz,ij} \tag{78}$$

Because the random number term is eliminated if a sum of all the terms is taken from formula 75, $K_{ij}=K_{ji}$ holds true at a high probability when all of the $b_r$ values are sufficiently large, just as in the fourth embodiment.

The operation in which information is communicated between entities is the same as in the third embodiment, and so will not be described here.

SIXTH EMBODIMENT

A sixth embodiment of the ID-NIKS according to the present invention will now be described. This embodiment relates to a system in which the usable number of secret keys is limited to 2d. The fourth embodiment requires a large number (d(d+1)/2) of secret keys, and the fifth embodiment requires approximately c times more secret keys. Therefore, it is impractical to use these systems as they are. In view of this, a practical system that keeps the number of secret keys used down to 2d will be described as the sixth embodiment.

Preprocessing at the Center 101

The center 101 prepares the following public key and secret key, and discloses the public key.

Public key $P_r$: large prime number of k bits

Secret key $A_r$: n×n matrix composed of random numbers belonging to GF ($P_r$)

Vector $\gamma_{r,i}$: personal random number vector composed of 1-bit random numbers The center 101 also discloses at the same time d number of one-way function vectors $h_1(\cdot), h_2(\cdot), \ldots, h_d(\cdot)$ that generate d number of n-dimensional public key vectors $v_{r,i}$=vectors $h_r(ID_i)$ (r=1, 2, . . . , d) composed of m-bit positive integers from the ID of an entity. The parameter b here is set as in the following formula, and we will consider a case in which b>0.

$b=k-(l+m+\log_2 n)$

Registration Processing of an Entity

Upon receiving a request for registration from an entity i, the center 101 determines d number of secret key vectors $s_{r,i}$ and $t_{r,i}$ for the entity i according to the following formulas 79 and 80 using the prepared keys and the d number of public key vectors $v_{1,i}, v_{2,i}, \ldots, v_{d,i}$ of the entity i, privately sends these vectors to the entity i, and completes the registration. We will let $B_r={}^tA_r$, and when the index becomes d+1, it will be converted to 1 and treated accordingly.

$$\vec{s_{r,i}} = (A_r\vec{v_{r+1,i}} + \vec{\gamma_{r,i}}) \bmod P_r \tag{79}$$

$$\vec{t_{r,i}} = (B_r\vec{v_{r,i}} - \vec{\gamma_{r+1,i}}) \bmod P_r \tag{80}$$

Processing for Generation of Common Key Between Entities

The entity i performs the following calculations to determine a common key $K_{ij}$ with an entity j. First, $A'_{r,ij}$ and $B'_{r,ij}$ are determined according to formulas 81 and 82 using modulus $P_r$, and then $K_{ij}$ is obtained by the calculation in formula 83 over integer ring.

$$A'_{r,ij} = {}^t\vec{s_{r,i}}\vec{v_{r,j}} \bmod P_r \tag{81}$$

$$B'_{r,ij} = {}^t\vec{t_{r,i}}\vec{v_{r+1,j}} \bmod P_r \tag{82}$$

$$K_{ij} = \sum_{r=1}^{d}(A'_{r,ij} + B'_{r,ij}) \tag{83}$$

The operation in which information is communicated between entities is the same as in the third embodiment, and so will not be described here.

The formal expression in this sixth embodiment is expressed as follows.

When d=2 (corresponds to the fifth embodiment)

$$\begin{pmatrix} O & \vec{s_{1,i}} \\ \vec{t_{1,i}} & O \end{pmatrix} = \begin{pmatrix} O & A_1(P_1) \\ B_1(P_1) & O \end{pmatrix}\begin{pmatrix} \vec{v_{1,i}} \\ \vec{v_{2,i}} \end{pmatrix} + \begin{pmatrix} O & \vec{\gamma_{1,i}} \\ -\vec{\gamma_{2,i}} & O \end{pmatrix}$$

$$\begin{pmatrix} O & \vec{s_{2,i}} \\ \vec{t_{2,i}} & O \end{pmatrix} = \begin{pmatrix} O & A_2(P_2) \\ B_2(P_2) & O \end{pmatrix}\begin{pmatrix} \vec{v_{1,i}} \\ \vec{v_{2,i}} \end{pmatrix} + \begin{pmatrix} O & \vec{\gamma_{1,i}} \\ -\vec{\gamma_{2,i}} & O \end{pmatrix}$$

When d≧3 (corresponds to the fourth embodiment)

$$\begin{pmatrix} O & \vec{s_{1,i}} & O & \cdots & \vec{t_{d,i}} \\ \vec{t_{1,i}} & O & \vec{s_{2,i}} & \ddots & \vdots \\ O & \vec{t_{2,i}} & O & \ddots & O \\ \vdots & \ddots & \ddots & \ddots & \vec{s_{d-1,i}} \\ \vec{s_{d,i}} & \cdots & O & \vec{t_{d-1,i}} & O \end{pmatrix} =$$

$$\begin{pmatrix} O & A_1(P_1) & O & \cdots & B_d(P_d) \\ B_1(P_1) & O & A_2(P_2) & \ddots & \vdots \\ O & B_2(P_2) & O & \ddots & \ddots \\ \vdots & \ddots & \ddots & \ddots & \vdots \\ A_d(P_d) & \cdots & \ddots & \ddots & O \end{pmatrix}\begin{pmatrix} \vec{v_{1,i}} \\ \vec{v_{2,i}} \\ \vdots \\ \vec{v_{d,i}} \end{pmatrix} +$$

$$\begin{pmatrix} O & \vec{\gamma_{1,i}} & O & \cdots & -\vec{\gamma_{1,i}} \\ -\vec{\gamma_{2,i}} & O & \vec{\gamma_{2,i}} & \ddots & \vdots \\ O & -\vec{\gamma_{3,i}} & O & \ddots & O \\ \vdots & \ddots & \ddots & \ddots & \vec{\gamma_{d-1,i}} \\ \vec{\gamma_{d,i}} & \cdots & O & -\vec{\gamma_{d,i}} & O \end{pmatrix}$$

As discussed in detail above, with the present invention, an operation is performed over finite fields in which P and Q serve as moduli, after which random numbers are eliminated by addition over integer ring, and keys can therefore be shared at a practically high probability. Also, when the size of the coefficients is limited, the fact that it is difficult to express an arbitrary vector by the linear combination of the vectors of conspirators is the basis of security, and this security is quite high. In particular, compared to conventional product-sum type NIKS, the collusion threshold with respect to linear attack is far higher. It is also possible to adjust the parameters according to the required degree of security, and in particular a setting of n=1 is possible.

Also, with the present invention, an operation is performed over finite fields in which large prime numbers serves as moduli, after which random numbers are eliminated by addition over integer ring, and keys can be shared at a practically high probability. A plurality of public keys can also be used to increase the size of the public key vector, thereby affording even greater security.

The above described and illustrated cryptographic communication method, encryption method, and cryptographic communication system are disclosed in Japanese Patent Application Nos. 10-262035 and 10-338190 filed in Japan on Sep. 16, 1998 and Nov. 27, 1998, respectively, the subject application claims priority of these Japanese Patent Applications, and the entire disclosures thereof are incorporated herein by reference.

What is claimed is:

1. A cryptographic communication method for communication of information between entities, in which an entity-specific secret key is generated at a center and sent to each entity from the center, one entity uses a common key determined from its own entity-specific secret key sent from the center and a publicly known public key of the other entity to encrypt a plaintext into a ciphertext and transmits the ciphertext to the an other entity, and the other entity uses the same common key as said common key, determined from its own entity-specific secret key sent from the center and a publicly known public key of the one entity, to decrypt said ciphertext sent from the one entity back into a plaintext, characterized in that each of said entity-specific secret keys includes at least one type of secret key selected from a plurality of types of secret keys in which each of a plurality of numbers serves as a modulus, said secret keys generated using said respective entities' public key and entity-specific random number, the one entity uses a plurality of its own said plural types of secret keys and the public key of the other of said entities to generate said common key, and the other of said entities uses a plurality of its own said plural types of secret keys and the public key of the one entity to generate said common key, and wherein said public key of each entity is determined by utilizing a hash function with specific information of each entity.

2. The cryptographic communication method according to claim 1, wherein, in the generation of said common key, said random number is eliminated by addition over integer ring.

3. The cryptographic communication method according to claim 1, wherein said random number is a multidimensional random number vector.

4. The cryptographic communication method according to claim 2, wherein said random number is a multidimensional random number vector.

5. The cryptographic communication method according to claim 1, wherein computational formulas for generating two types of said secret key at said center are as follows:

$$\vec{s}_i = (A\vec{v}_i + \vec{\gamma}_i) \bmod P$$

$$\vec{t}_i = (B\vec{v}_i - \vec{\gamma}_i) \bmod Q$$

where

Vector $s_i$: one secret key of the entity i

Vector $t_i$: the other secret key of the entity i

P and Q: publicly known prime numbers

A and B: symmetric matrices composed of random numbers known only to the center

Vector γi: personal random number vector composed of random numbers.

6. The cryptographic communication method according to claim 2, wherein computational formulas for generating two types of said secret key at said center are as follows:

$$\vec{s}_i = (A\vec{v}_i + \vec{\gamma}_i) \bmod P$$

$$\vec{t}_i = (B\vec{v}_i - \vec{\gamma}_i) \bmod Q$$

where

Vector $s_i$: one secret key of the entity i

Vector $t_i$: the other secret key of the entity i

P and Q: publicly known prime numbers

A and B: symmetric matrices composed of random numbers known only to the center

Vector γi: personal random number vector composed of random numbers.

7. The cryptographic communication method according to claim 3, wherein computational formulas for generating two types of said secret key at said center are as follows:

$$\vec{s}_i = (A\vec{v}_i + \vec{\gamma}_i) \bmod P$$

$$\vec{t}_i = (B\vec{v}_i - \vec{\gamma}_i) \bmod Q$$

where

Vector $s_i$: one secret key of the entity i

Vector $t_i$: the other secret key of the entity i

P and Q: publicly known prime numbers

A and B: symmetric matrices composed of random numbers known only to the center

Vector γi: personal random number vector composed of random numbers.

8. The cryptographic communication method according to claim 4, wherein computational formulas for generating two types of said secret key at said center are as follows:

$$\vec{s}_i = (A\vec{v}_i + \vec{\gamma}_i) \bmod P$$

$$\vec{t}_i = (B\vec{v}_i - \vec{\gamma}_i) \bmod Q$$

where

Vector $s_i$: one secret key of the entity i

Vector $t_i$: the other secret key of the entity i

P and Q: publicly known prime numbers

A and B: symmetric matrices composed of random numbers known only to the center

Vector γi: personal random number vector composed of random numbers.

9. The cryptographic communication method according to claim 5, wherein computational formulas for generating said common key for the entities are as follows:

$$A_{ij}' = {}^t\vec{s}_i \vec{v}_j \bmod P$$

$$B_{ij}' = {}^t\vec{t}_i \vec{v}_j \bmod Q$$

$$K_{ij} = A_{ij}' + B_{ij}'$$

where $K_{ij}$: common key generated by one entity i for another entity j

Vector $V_j$: public key of entity j $A_{ij}'$ and $B_{ij}'$: intermediate values for generating the common key $K_{ij}$.

10. The cryptographic communication method according to claim 6, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij} = A_{ij}' + B_{ij}'$$

where $K_{ij}$: common key generated by one entity i for another entity j

Vector $v_j$: public key of entity j $A_{ij}'$ and $B_{ij}'$: intermediate values for generating the common key $K_{ij}$.

11. The cryptographic communication method according to claim 7, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij} = A_{ij}' + B_{ij}'$$

where $K_{ij}$: common key generated by one entity i for another entity j

Vector $v_j$: public key of entity j $A_{ij}'$ and $B_{ij}'$: intermediate values for generating the common key $K_{ij}$.

12. The cryptographic communication method according to claim 8, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij} = A_{ij}' + B_{ij}'$$

where $K_{ij}$: common key generated by one entity i for another entity j

Vector $v_j$: public key of entity j $A_{ij}'$ and $B_{ij}'$: intermediate values for generating the common key $K_{ij}$.

13. The cryptographic communication method according to claim 5, wherein said P and Q are k bits to satisfy following formulas:

$$P \equiv \delta \pmod{R}$$

$$Q \equiv \epsilon \pmod{R}$$

where

R: prime number of d bits $\delta$ and $\epsilon$: number of e bits k>d>e.

14. The cryptographic communication method according claim 6, wherein said P and Q are k bits to satisfy following formulas:

$$P \equiv \delta \pmod{R}$$

$$Q \equiv \epsilon \pmod{R}$$

where

R: prime number of d bits $\delta$ and $\epsilon$: number of e bits k>d>e.

15. The cryptographic communication method according claim 7, wherein said P and Q are k bits to satisfy the following formulas:

$$P \equiv \delta \pmod{R}$$

$$Q \equiv \epsilon \pmod{R}$$

where

R: prime number of d bits $\delta$ and $\epsilon$: number of e bits k>d>e.

16. The cryptographic communication method according to claim 8, wherein said P and Q are k bits to satisfy following formulas:

$$P \equiv \delta \pmod{R}$$

$$Q \equiv \epsilon \pmod{R}$$

where

R: prime number of d bits $\delta$ and $\epsilon$: number of e bits k>d>e.

17. The cryptographic communication method according to claim 13, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij}' = A_{ij}' + B_{ij}'$$

$$K_{ij}'' = K_{ij}' \bmod R$$

$$K_{ij} = \left\lfloor \frac{K_{ij}''}{2^{e+c}} \right\rfloor$$

where $K_{ij}$: common key generated by one entity i for another entity j $K_{ij}'$: an intermediate value for generating the common key $K_{ij}$ $K_{ij}''$: an intermediate value for generating the common key $K_{ij}$, i.e., remainder of dividing $K_{ij}'$ by R.

18. The cryptographic communication method according to claim 14, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij}' = A_{ij}' + B_{ij}'$$

$$K_{ij}'' = K_{ij}' \bmod R$$

$$K_{ij} = \left\lfloor \frac{K_{ij}''}{2^{e+c}} \right\rfloor$$

where $K_{ij}$: common key generated by one entity i for another entity j $K_{ij}'$: an intermediate value for generating the common key $K_{ij}$ $K_{ij}''$: an intermediate value for generating the common key $K_{ij}$, i.e., remainder of dividing $K_{ij}'$ by R.

19. The cryptographic communication method according to claim 15, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij}' = A_{ij}' + B_{ij}'$$

$$K_{ij}'' = K_{ij}' \bmod R$$

$$K_{ij} = \left\lfloor \frac{K_{ij}''}{2^{e+c}} \right\rfloor$$

where $K_{ij}$: common key generated by one entity i for another entity j $K_{ij}'$: an intermediate value for generating the common key $K_{ij}$ $K_{ij}''$: an intermediate value for generating the common key $K_{ij}$, i.e., remainder of dividing $K_{ij}'$ by R.

20. The cryptographic communication method according to claim 16, wherein computational formulas for generating said common key for the entities are as follows:

$$A_{ij}' = {}^t\vec{s_i}\vec{v_j} \bmod P$$

$$B_{ij}' = {}^t\vec{t_i}\vec{v_j} \bmod Q$$

$$K_{ij}' = A_{ij}' + B_{ij}'$$

$$K_{ij}'' = K_{ij}' \bmod R$$

$$K_{ij} = \left\lfloor \frac{K_{ij}''}{2^{e+c}} \right\rfloor$$

where $K_{ij}$: common key generated by one entity i for another entity j $K_{ij}'$: an intermediate value for generating the common key $K_{ij}$ $K_{ij}''$: an intermediate value for generating the common key $K_{ij}$, i.e., remainder of dividing $K_{ij}'$ by R.

21. An encryption method, in which secret keys are sent to a plurality of entities, said secret keys being specific to the entities to which they are sent, and said entities use their own said entity-specific keys to encrypt a plaintext into a ciphertext, characterized in that said entity-specific secret key includes includes at least one type of secret key selected from a plurality of types of secret keys in which each of a plurality of numbers serves as a modulus, said secret keys generated using a one-entity-specific public key and one-entity-specific secret random number, and the one entity encrypts a plaintext into a ciphertext using a common key generated using a plurality of its own said types of secret keys and a public key of an other entity, said other entity being an intended recipient of the ciphertext, and wherein said public key of each entity is determined by utilizing a hash function with specific information of each entity.

22. A cryptographic communication system including a plurality of entities, in which encryption into a ciphertext of a plaintext to be transmitted, and decryption of the transmitted ciphertext back into a plaintext, are performed mutually between the plurality of entities, said cryptographic communication system comprising:

a center for using an entity-specific public key and an entity-specific secret random number to generate includes at least one type of secret key selected from a plurality of types of secret keys for each entity, with each of a plurality of numbers serving as a modulus in relation to the plural types of secret keys, and sending the plural types of secret keys to each entity; and a plurality of entities, one of which entities uses a plurality of its own said types of secret keys sent from said center and a public key specific to other entity, said other entity being a ciphertext recipient, to generate a common key for performing said encryption, and said other entity uses a plurality of its own said types of secret keys sent from said center and a public key specific to the one entity to generate the same common key for performing said decryption, and wherein said public key of each entity is determined by utilizing a hash function with specific information of each entity.

23. A cryptographic communication method for communication of information between entities, in which an entity-specific secret key is generated at a center and sent to each entity from the center, one entity uses a common key determined from its own entity-specific secret key sent from the center and a publicly known public key of an other entity to encrypt a plaintext into a ciphertext and transmits the ciphertext to the an other entity, and the other entity uses the same common key as said common key, determined from its own entity-specific secret key sent from the center and a publicly known public key of the one entity, to decrypt said ciphertext back into the plaintext, characterized in that said entity-specific secret key of the one entity includes a plurality of secret keys in which each of a plurality of numbers serves as a modulus, said plurality of secret keys being generated using a plurality of public keys of the one entity and a plurality of entity-specific random numbers of the one entity, said entity-specific secret key of the other entity includes a plurality of secret keys in which each of a plurality of numbers serves as a modulus, said plurality of secret keys of the other entity being generated using a plurality of public keys of the other entity and a plurality of entity-specific random numbers of the other entity, the one entity uses a plurality of its secret keys and a plurality of public keys of the other entity to generate said common key, and the other entity uses a plurality of its own secret keys and a plurality of public keys of the one entity to generate said common key, and wherein said public key of each entity is determined by utilizing a hash function with specific information of each entity.

24. The cryptographic communication method according to claim 23, wherein, in the generation of said common key, said plurality of random numbers are eliminated by addition over integer ring.

25. The cryptographic communication method according to claim 23, wherein said plurality of random numbers are a plurality of multidimensional random number vectors.

26. The cryptographic communication method according to claim 24, wherein said plurality of random numbers are a plurality of multideminsional random number vectors.

27. The cryptographic communication method according to claim 23, wherein computational formula for generating four of said secret keys at said center is as follows (A), and computational formula for generating said common key at each entity is as follows (B):

$$\begin{cases} \vec{s_{11,i}} = (A_1\vec{v_{1,i}} + \vec{\gamma_{1,i}})\bmod P_1 \\ \vec{s_{22,i}} = (A_2\vec{v_{2,i}} + \vec{\gamma_{2,i}})\bmod P_2 \\ \vec{s_{21,i}} = (A_3\vec{v_{1,i}} - \vec{\gamma_{2,i}})\bmod P_3 \\ \vec{s_{12,i}} = ({}^tA_3\vec{v_{2,i}} - \vec{\gamma_{1,i}})\bmod P_3 \end{cases} \quad (A)$$

where

Vector $S_{11,i}$: first secret key of entity i
Vector $S_{22,i}$: second secret key of entity i
Vector $S_{21,i}$: third secret key of entity i
Vector $S_{12,i}$: fourth secret key of entity i
Vector $v_{1,i}$: first public key of entity i
Vector $v_{2,i}$: second public key of entity i
$P_1$, $P_2$, and $P_3$: publicly known prime numbers
$A_1$ and $A_2$: secret symmetric matrices composed of random numbers known only to the center
$A_3$: secret matrix composed of random numbers known only to the center
Vector $\gamma_{1,i}$: first personal random number vector composed of random numbers
Vector $\gamma_{2,i}$: second personal random number vector composed of random numbers $$K_{ij} = A_{11,ij}' + A_{22,ij}' + A_{21,ij}' + A_{12,ij}' \quad (B)$$

$$\begin{cases} A'_{11,ij} = {}^t\vec{s_{11,i}}\vec{v_{1,j}}\bmod P_1 \\ A'_{22,ij} = {}^t\vec{s_{22,i}}\vec{v_{2,j}}\bmod P_2 \\ A'_{21,ij} = {}^t\vec{s_{21,i}}\vec{v_{2,j}}\bmod P_3 \\ A'_{12,ij} = {}^t\vec{s_{12,i}}\vec{v_{1,j}}\bmod P_3 \end{cases}$$

where $K_{ij}$: common key generated by one entity i for another entity j
Vector $v_{1,j}$: first public key of entity j
Vector $v_{2,j}$: second public key of entity j
$A_{11,ij}'$, $A_{22,ij}'$, $A_{21,ij}'$, and $A_{12,ij}'$: intermediate values for generating the common key $K_{ij}$.

28. The cryptographic communication method according to claim 24, wherein computational formula for generating four of said secret keys at said center is as follows (A), and computational formula for generating said common key at each entity is as follows (B):

$$\begin{cases} \vec{s_{11,i}} = (A_1\vec{v_{1,i}} + \vec{\gamma_{1,i}})\bmod P_1 \\ \vec{s_{22,i}} = (A_2\vec{v_{2,i}} + \vec{\gamma_{2,i}})\bmod P_2 \\ \vec{s_{21,i}} = (A_3\vec{v_{1,i}} - \vec{\gamma_{2,i}})\bmod P_3 \\ \vec{s_{12,i}} = ({}^tA_3\vec{v_{2,i}} - \vec{\gamma_{1,i}})\bmod P_3 \end{cases} \quad (A)$$

where

Vector $S_{11,i}$: first secret key of entity i
Vector $S_{22,i}$: second secret key of entity i
Vector $S_{21,i}$: third secret key of entity i
Vector $S_{12,i}$: fourth secret key of entity i
Vector $v_{1,i}$: first public key of entity i
Vector $v_{2,i}$: second public key of entity i
$P_1$, $P_2$, and $P_3$: publicly known prime numbers
$A_1$ and $A_2$: symmetric matrices composed of random numbers known only to the center
$A_3$: matrix composed of random numbers known only to the center
Vector $\gamma_{1,i}$: first personal random number vector composed of random numbers
Vector $\gamma_{2,i}$: second personal random number vector composed of random numbers $$K_{ij} = A_{11,ij}' + A_{22,ij}' + A_{21,ij}' + A_{12,ij}' \quad (B)$$

$$\begin{cases} A'_{11,ij} = {}^t\vec{s_{11,i}}\vec{v_{1,j}}\bmod P_1 \\ A'_{22,ij} = {}^t\vec{s_{22,i}}\vec{v_{2,j}}\bmod P_2 \\ A'_{21,ij} = {}^t\vec{s_{21,i}}\vec{v_{2,j}}\bmod P_3 \\ A'_{12,ij} = {}^t\vec{s_{12,i}}\vec{v_{1,j}}\bmod P_3 \end{cases}$$

where $K_{ij}$: common key generated by one entity i for another entity j
Vector $v_{1,j}$: first public key of entity j
Vector $v_{2,j}$: second public key of entity j
$A_{11,ij}'$, $A_{22,ij}'$, $A_{21,ij}'$, and $A_{12,ij}'$: intermediate values for generating the common key $K_{ij}$.

29. The cryptographic communication method according to claim 25, wherein computational formula for generating four of said secret keys at said center is as follows (A), and computational formula for generating said common key at each entity is as follows (B):

$$\begin{cases} \vec{s_{11,i}} = (A_1\vec{v_{1,i}} + \vec{\gamma_{1,i}})\bmod P_1 \\ \vec{s_{22,i}} = (A_2\vec{v_{2,i}} + \vec{\gamma_{2,i}})\bmod P_2 \\ \vec{s_{21,i}} = (A_3\vec{v_{1,i}} - \vec{\gamma_{2,i}})\bmod P_3 \\ \vec{s_{12,i}} = ({}^tA_3\vec{v_{2,i}} - \vec{\gamma_{1,i}})\bmod P_3 \end{cases} \quad (A)$$

where

Vector $S_{11,i}$: first secret key of entity i
Vector $S_{22,i}$: second secret key of entity i
Vector $S_{21,i}$: third secret key of entity i
Vector $S_{12,i}$: fourth secret key of entity i
Vector $v_{1,i}$: first public key of entity i
Vector $v_{2,i}$: second public key of entity i
$P_1$, $P_2$, and $P_3$: publicly known prime numbers
$A_1$ and $A_2$: symmetric matrices composed of random numbers known only to the center
$A_3$: matrix composed of random numbers known only to the center
Vector $\gamma_{1,i}$: first personal random number vector composed of random numbers
Vector $\gamma_{2,i}$: second personal random number vector composed of random numbers $$K_{ij} = A_{11,ij}' + A_{22,ij}' + A_{21,ij}' + A_{12,ij}' \quad (B)$$

$$\begin{pmatrix} A'_{11,ij} = {}^t\overrightarrow{s_{11,i}}\overrightarrow{v_{1,j}} \bmod P_1 \\ A'_{22,ij} = {}^t\overrightarrow{s_{22,i}}\overrightarrow{v_{2,j}} \bmod P_2 \\ A'_{21,ij} = {}^t\overrightarrow{s_{21,i}}\overrightarrow{v_{2,j}} \bmod P_3 \\ A'_{12,ij} = {}^t\overrightarrow{s_{12,i}}\overrightarrow{v_{1,j}} \bmod P_3 \end{pmatrix}$$

where $K_{ij}$: common key generated by one entity i for another entity j

Vector $v_{1,j}$: first public key of entity j

Vector $v_{2,j}$: second public key of entity j $A_{11,ij}'$, $A_{22,ij}'$, $A_{21,ij}'$, and $A_{12,ij}'$: intermediate values for generating the common key $K_{ij}$.

30. The cryptographic communication method according to claim 26, wherein computational formula for generating four of said secret keys at said center is as follows (A), and computational formula for generating said common key at each entity is as follows (B):

$$\left.\begin{matrix} \overrightarrow{s_{11,i}} = (A_1\overrightarrow{v_{1,i}} + \overrightarrow{\gamma_{1,i}}) \bmod P_1 \\ \overrightarrow{s_{22,i}} = (A_2\overrightarrow{v_{2,i}} + \overrightarrow{\gamma_{2,i}}) \bmod P_2 \\ \overrightarrow{s_{21,i}} = (A_3\overrightarrow{v_{1,i}} - \overrightarrow{\gamma_{2,i}}) \bmod P_3 \\ \overrightarrow{s_{12,i}} = ({}^tA_3\overrightarrow{v_{2,i}} - \overrightarrow{\gamma_{1,i}}) \bmod P_3 \end{matrix}\right\} \quad (A)$$

where

Vector $S_{11,i}$: first secret key of entity i

Vector $S_{22,i}$: second secret key of entity i

Vector $S_{21,i}$: third secret key of entity i

Vector $S_{12,i}$: fourth secret key of entity i

Vector $v_{1,i}$: first public key of entity i

Vector $v_{2,i}$: second public key of entity i $P_1$, $P_2$, and $P_3$: publicly known prime numbers $A_1$ and $A_2$: symmetric matrices composed of random numbers known only to the center $A_3$: matrix composed of random numbers known only to the center Vector $\gamma_{1,i}$: first personal random number vector composed of random numbers Vector $\gamma_{2,i}$: second personal random number vector composed of random numbers $$K_{ij} = A_{11,ij}' + A_{22,ij}' + A_{21,ij}' + A_{12,ij}' \quad (B)$$

$$\begin{pmatrix} A'_{11,ij} = {}^t\overrightarrow{s_{11,i}}\overrightarrow{v_{1,j}} \bmod P_1 \\ A'_{22,ij} = {}^t\overrightarrow{s_{22,i}}\overrightarrow{v_{2,j}} \bmod P_2 \\ A'_{21,ij} = {}^t\overrightarrow{s_{21,i}}\overrightarrow{v_{2,j}} \bmod P_3 \\ A'_{12,ij} = {}^t\overrightarrow{s_{12,i}}\overrightarrow{v_{1,j}} \bmod P_3 \end{pmatrix}$$

where $K_{ij}$: common key generated by one entity i for another entity j

Vector $v_{1,j}$: first public key of entity j

Vector $v_{2,j}$: second public key of entity j $A_{11,ij}'$, $A_{22,ij}'$, $A_{21,ij}'$, and $A_{12,ij}'$: intermediate values for generating the common key $K_{ij}$.

31. The cryptographic communication method according to claim 23, wherein there are d number of public keys for each entity, computational formula for generating $d^2$ number of said secret keys at said center is as follows (C), and computational formula for generating said common key at each entity is as follows (D):

$$\overrightarrow{s_{yz,i}} = (A_{yz}\overrightarrow{v_{z,i}} + \overrightarrow{\gamma_{yz,i}}) \bmod P_{yz} \quad (C)$$

where $A_{yz}$ (y and z=1, 2, . . . , d): a sub-matrix generated by partitioning an n×n symmetric matrix A in both the row and column directions at $n_1$, $n_2$, . . . , $n_d$ (where $n = n_1 + n_2 + \ldots + n_d$)

Vector $S_{yz,i}$: $d^2$ number of secret keys of entity i

Vector $v_{z,i}$: a vector generated by dividing a public key column vector $v_i$ of entity i in the column direction into sizes of $n_1$, $n_2$, . . . , $n_d$ Vector $\gamma_{yz,i}$: a vector generated by dividing a personal random number column vector $\gamma_{z,i}$ of entity i in the column direction into sizes of $n_1$, $n_2$, . . . , $n_d$ $P_{yz}$: publicly known prime number $$K_{ij} = \sum_{y=1}^{d}\sum_{z=1}^{d} A'_{yz,ij} \quad (D)$$

$$A'_{yz,ij} = {}^t\overrightarrow{s_{yz,i}}\overrightarrow{v_{y,j}} \bmod P_{yz}$$

where $K_{ij}$: common key generated by one entity i for another entity j

Vector $v_{y,j}$: a vector generated by dividing a public key row vector $v_j$ of entity j in the row direction into sizes of $n_1$, $n_2$, . . . , $n_d$ $A_{yz,ij}'$: $d^2$ number of intermediate values for generating the common key $K_{ij}$.

32. The cryptographic communication method according to claim 24, wherein there are d number of public keys for each entity, computational formula for generating $d^2$ number of said secret keys at said center is as follows (C), and computational formula for generating said common key at each entity is as follows (D):

$$\overrightarrow{s_{yz,i}} = (A_{yz}\overrightarrow{v_{z,i}} + \overrightarrow{\gamma_{yz,i}}) \bmod P_{yz} \quad (C)$$

where $A_{yz}$ (y and z=1, 2, . . . , d): a sub-matrix generated by partitioning an n×n symmetric matrix A in both the row and column directions at $n_1$, $n_2$, . . . $n_d$ (where $n=n_1+n_2+ \ldots +n_d$)

Vector $S_{yz,i}$: $d^2$ number of secret keys of entity i

Vector $v_{z,i}$: a vector generated by dividing a public key column vector $v_i$ of entity i in the column direction into sizes of $n_1$, $n_2$, . . . , $n_d$ Vector $\gamma_{yz,i}$: a vector generated by dividing a personal random number column vector $\gamma_{z,i}$ of entity i in the column direction into sizes of $n_1$, $n_2$, . . . , $n_d$ $P_{yz}$: publicly known prime number $$K_{ij} = \sum_{y=1}^{d}\sum_{z=1}^{d} A'_{yz,ij} \quad (D)$$

-continued $$A'_{yz,ij} = {}^t\overrightarrow{s_{yz,i}}\overrightarrow{v_{y,j}} \bmod P_{yz}$$

where $K_{ij}$: common key generated by one entity i for another entity j

Vector $v_{y,j}$: a vector generated by dividing a public key row vector $v_j$ of entity j in the row direction into sizes of $n_1, n_2, \ldots, n_d$ $A_{yz,ij}'$: $d^2$ number of intermediate values for generating the common key $K_{ij}$.

33. The cryptographic communication method according to claim 25, wherein there are d number of public keys for each entity, computational formula for generating $d^2$ number of said secret keys at said center is as follows (C), and computational formula for generating said common key at each entity is as follows (D):

$$\overrightarrow{s_{yz,i}} = (A_{yz}\overrightarrow{v_{z,i}} + \overrightarrow{\gamma_{yz,i}})\bmod P_{yz} \quad (C)$$

where $A_{yz}$ (y and z=1, 2, ..., d): a sub-matrix generated by partitioning an n×n symmetric matrix A in both the row and column directions at $n_1, n_2 \ldots n_d$ (where $n=n_1+n_2+\ldots+n_d$)

Vector $S_{yz,i}$: $d^2$ number of secret keys of entity i

Vector $v_{z,i}$: a vector generated by dividing a public key column vector $v_i$ of entity i in the column direction into sizes of $n_1, n_2, \ldots, n_d$ Vector $\gamma_{yz,i}$: a vector generated by dividing a personal random number column vector $\gamma_{z,i}$ of entity i in the column direction into sizes of $n_1, n_2, \ldots, n_d$ $P_{yz}$: publicly known prime number $$K_{ij} = \sum_{y=1}^{d}\sum_{z=1}^{d} A'_{yz,ij} \quad (D)$$

$$A'_{yz,ij} = {}^t\overrightarrow{s_{yz,i}}\overrightarrow{v_{y,j}} \bmod P_{yz}$$

where $K_{ij}$: common key generated by one entity i for another entity j

Vector $v_{y,j}$: a vector generated by dividing a public key row vector $v_j$ of entity j in the row direction into sizes of $n_1, n_2, \ldots, n_d$ $A_{yz,ij}'$: $d^2$ number of intermediate values for generating the common key $K_{ij}$.

34. The cryptographic communication method according to claim 26, wherein there are d number of public keys for each entity, computational formula for generating $d^2$ number of said secret keys at said center is as follows (C), and computational formula for generating said common key at each entity is as follows (D):

$$\overrightarrow{s_{yz,i}} = (A_{yz}\overrightarrow{v_{z,i}} + \overrightarrow{\gamma_{yz,i}})\bmod P_{yz} \quad (C)$$

where $A_{yz}$ (y and z=1, 2, ..., d): a sub-matrix generated by partitioning an n×n symmetric matrix A in both the row and column directions at $n_1, n_2 \ldots n_d$ (where $n=n_1+n_2+\ldots+n_d$)

Vector $S_{yz,i}$: $d^2$ number of secret keys of entity i

Vector $v_{z,i}$: a vector generated by dividing a public key column vector $v_i$ of entity i in the column direction into sizes of $n_1, n_2, \ldots, n_d$ Vector $\gamma_{yz,i}$: a vector generated by dividing a personal random number column vector $\gamma_{z,i}$ of entity i in the column direction into sizes of $n_1, n_2, \ldots, nd$ $P_{yz}$: publicly known prime number $$K_{ij} = \sum_{y=1}^{d}\sum_{z=1}^{d} A'_{yz,ij} \quad (D)$$

$$A'_{yz,ij} = {}^t\overrightarrow{s_{yz,i}}\overrightarrow{v_{y,j}} \bmod P_{yz}$$

where $K_{ij}$: common key generated by one entity i for another entity j

Vector $v_{y,j}$: a vector generated by dividing a public key row vector $v_j$ of entity j in the row direction into sizes of $n_1, n_2, \ldots, n_d$ $A_{yz,ij}'$: $d^2$ number of intermediate values for generating the common key $K_{ij}$.

35. The cryptographic communication method according to claim 31, wherein a plurality of combinations are used, each combination including d number of public keys for each entity, and $d^2$ number of secret keys for each entity.

36. The cryptographic communication method according to claim 32, wherein a plurality of combinations are used, each combination including d number of public keys for each entity, and $d^2$ number of secret keys for each entity.

37. The cryptographic communication method according to claim 33, wherein a plurality of combinations are used, each combination including d number of public keys for each entity, and $d^2$ number of secret keys for each entity.

38. The cryptographic communication method according to claim 34, wherein a plurality of combinations are used, each combination including d number of public keys for each entity, and $d^2$ number of secret keys for each entity.

39. The cryptographic communication method according to claim 23 wherein the computational formula for generating the 2d number of said secret keys at said center is as follows (E), and computational formula for generating said common key at each entity is as follows (F):

$$\left.\begin{array}{l}\overrightarrow{s_{r,i}} = (A_r\overrightarrow{v_{r+1,i}} + \overrightarrow{\gamma_{r,i}})\bmod P_r \\ \overrightarrow{t_{r,i}} = (B_r\overrightarrow{v_{r,i}} - \overrightarrow{\gamma_{r+1,i}})\bmod P_r\end{array}\right\} \quad (E)$$

where

Vector $s_{r,i}$: d number of secret keys of entity i

Vector $t_{r,i}$: d number of secret keys of entity i

Ar: a secret matrix composed of random numbers known only to the center $B_r = {}^t A_r$ Vector $v_{r,i}$: d number of public keys of entity i Vector $\gamma_{r,i}$: d number of personal random number vectors composed of random numbers Pr: publicly known prime number $$K_{ij} = \sum_{r=1}^{d}(A'_{r,ij} + B'_{r,ij}) \quad (F)$$

$$\begin{pmatrix} A'_{r,ij} = {}^t\overrightarrow{s_{r,i}}\overrightarrow{v_{r,j}} \bmod P_r \\ B'_{r,ij} = {}^t\overrightarrow{t_{r,i}}\overrightarrow{v_{r+1,j}} \bmod P_r \end{pmatrix}$$

where $K_{ij}$: common key generated by one entity i for another entity j

Vector $v_{r,j}$: d number of public keys of entity j $A_{r,ij}'$ and $B_{r,ij}'$: an intermediate value for generating the common key $K_{ij}$.

40. The cryptographic communication method according to claim 24, wherein the computational formula for generating the 2d number of said secret keys at said center is as follows (E), and computational formula for generating said common key at each entity is as follows (F):

$$\overrightarrow{s_{r,i}} = (A_r \overrightarrow{v_{r+1,i}} + \overrightarrow{\gamma_{r,i}}) \bmod P_r \\ \overrightarrow{t_{r,i}} = (B_r \overrightarrow{v_{r,i}} - \overrightarrow{\gamma_{r+1,i}}) \bmod P_r \quad (E)$$

where

Vector $s_{r,i}$: d number of secret keys of entity i

Vector $t_{r,i}$: d number of secret keys of entity i

Ar: a secret matrix composed of random numbers known only to the center $B_r = {}^t A_r$ Vector $v_{r,i}$: d number of public keys of entity i Vector $\gamma_{r,i}$: d number of personal random number vectors composed of random numbers Pr: publicly known prime number $$K_{ij} = \sum_{r=1}^{d}(A'_{r,ij} + B'_{r,ij}) \quad (F)$$

$$\begin{pmatrix} A'_{r,ij} = {}^t\overrightarrow{s_{r,i}}\overrightarrow{v_{r,j}} \bmod P_r \\ B'_{r,ij} = {}^t\overrightarrow{t_{r,i}}\overrightarrow{v_{r+1,j}} \bmod P_r \end{pmatrix}$$

where $K_{ij}$: common key generated by one entity i for another entity j

Vector $v_{r,j}$: d number of public keys of entity j $A_{r,ij}'$ and $B_{r,ij}'$: an intermediate value for generating the common key $K_{ij}$.

41. The cryptographic communication method according to claim 25, wherein the computational formula for generating the 2d number of said secret keys at said center is as follows (E), and computational formula for generating said common key at each entity is as follows (F):

$$\overrightarrow{s_{r,i}} = (A_r \overrightarrow{v_{r+1,i}} + \overrightarrow{\gamma_{r,i}}) \bmod P_r \\ \overrightarrow{t_{r,i}} = (B_r \overrightarrow{v_{r,i}} - \overrightarrow{\gamma_{r+1,i}}) \bmod P_r \quad (E)$$

where

Vector $s_{r,i}$: d number of secret keys of entity i

Vector $t_{r,i}$: d number of secret keys of entity i

Ar: a secret matrix composed of random numbers known only to the center $B_r = {}^t A_r$ Vector $v_{r,i}$: d number of public keys of entity i Vector $\gamma_{r,i}$: d number of personal random number vectors composed of random numbers Pr: publicly known prime number $$K_{ij} = \sum_{r=1}^{d}(A'_{r,ij} + B'_{r,ij})\begin{pmatrix} A'_{r,ij} = {}^t\overrightarrow{s_{r,i}}\overrightarrow{v_{r,j}} \bmod P_r \\ B'_{r,ij} = {}^t\overrightarrow{t_{r,i}}\overrightarrow{v_{r+1,j}} \bmod P_r \end{pmatrix} \quad (F)$$

where $K_{ij}$: common key generated by one entity i for another entity j

Vector $v_{r,j}$: d number of public keys of entity j $A_{r,ij}'$ and $B_{r,ij}'$: an intermediate value for generating the common key $K_{ij}$.

42. The cryptographic communication method according to claim 26, wherein the computational formula for generating the 2d number of said secret keys at said center is as follows (E), and computational formula for generating said common key at each entity is as follows (F):

$$\overrightarrow{s_{r,i}} = (A_r \overrightarrow{v_{r+1,i}} + \overrightarrow{\gamma_{r,i}}) \bmod P_r \\ \overrightarrow{t_{r,i}} = (B_r \overrightarrow{v_{r,i}} - \overrightarrow{\gamma_{r+1,i}}) \bmod P_r \quad (E)$$

where

Vector $s_{r,i}$: d number of secret keys of entity i

Vector $t_{r,i}$: d number of secret keys of entity i

Ar: a secret matrix composed of random numbers known only to the center $B_r = {}^t A_r$ Vector $v_{r,i}$: d number of public keys of entity i Vector $\gamma_{r,i}$: d number of personal random number vectors composed of random numbers Pr: publicly known prime number $$K_{ij} = \sum_{r=1}^{d}(A'_{r,ij} + B'_{r,ij})\begin{pmatrix} A'_{r,ij} = {}^t\overrightarrow{s_{r,i}}\overrightarrow{v_{r,j}} \bmod P_r \\ B'_{r,ij} = {}^t\overrightarrow{t_{r,i}}\overrightarrow{v_{r+1,j}} \bmod P_r \end{pmatrix} \quad (F)$$

where $K_{ij}$: common key generated by one entity i for another entity j

Vector $v_{r,j}$: d number of public keys of entity j $A_{r,ij}'$ and $B_{r,ij}'$: an intermediate value for generating the common key $K_{ij}$.

43. An encryption method, in which secret keys are sent to a plurality of entities, said secret keys being specific to the entities to which they are sent, and said entities use their own said entities-specific keys to encrypt a plaintext into a ciphertext, wherein said entity-specific secret key of each entity includes at least one type of secret keys selected from a plurality of types of secret keys in which each of a plurality of numbers serves as a modulus, said plurality of secret keys being generated using a plurality of its own entity-specific public keys and a plurality of its own entity-specific secret random numbers, and a plaintext is encrypted by one entity into a ciphertext using a common key generated using said plurality of secret keys of the one entity and a plurality of public keys of an other entity, said one entity being a ciphertext sender and said other entity being the intended recipient of the ciphertext.

44. A cryptographic communication system including a plurality of entities, in which encryption into a ciphertext of a plaintext to be transmitted, and decryption of the transmitted ciphertext back into the plaintext, are performed mutually between the plurality of entities, said cryptographic communication system comprising:

a center for using a plurality of public keys specific to each entity and a plurality of secret random numbers specific to each entity to generate a plurality of secret keys for each entity, in which each of a plurality of numbers serves as a modulus, and for sending the plurality of secret keys to the entities, respectively; and a plurality of entities, one of which uses its own plurality of secret keys sent from said center and a plurality of public keys specific to an other entity, said other entity being a ciphertext recipient, to generate a common key for performing said encryption, and an other of which uses its own plurality of secret keys sent from said center and a plurality of public keys specific to the one entity, said other entity being a ciphertext sender, to generate the same common key for performing said decryption.

* * * * *